United States Patent
Suzuki et al.

(10) Patent No.: US 9,509,871 B2
(45) Date of Patent: Nov. 29, 2016

(54) INFORMATION PROCESSING APPARATUS, INFORMATION PROCESSING SYSTEM, INFORMATION PROCESSING METHOD, AND NON-TRANSITORY COMPUTER READABLE MEDIUM

(71) Applicant: FUJI XEROX CO., LTD., Tokyo (JP)

(72) Inventors: Tetsuo Suzuki, Yokohama (JP); Yukio Tajima, Yokohama (JP); Masahiro Tose, Yokohama (JP); Kazuko Kirihara, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/796,627

(22) Filed: Jul. 10, 2015

(65) Prior Publication Data
US 2016/0088175 A1    Mar. 24, 2016

(30) Foreign Application Priority Data
Sep. 24, 2014 (JP) ................................. 2014-193646

(51) Int. Cl.
*H04N 1/00* (2006.01)
*H04N 1/32* (2006.01)

(52) U.S. Cl.
CPC ...... *H04N 1/00477* (2013.01); *H04N 1/00206* (2013.01); *H04N 1/00217* (2013.01); *H04N 1/32539* (2013.01); *H04N 2201/0094* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 2013/0268624 A1* | 10/2013 | Yagiura | ................. | H04L 67/025 709/217 |
| 2014/0211257 A1* | 7/2014 | Ishii | ................... | H04N 1/32539 358/1.15 |
| 2014/0379781 A1* | 12/2014 | Kobayashi | .............. | H04L 67/38 709/203 |

FOREIGN PATENT DOCUMENTS

JP    2011-048857 A    3/2011

* cited by examiner

*Primary Examiner* — Ngon Nguyen
(74) *Attorney, Agent, or Firm* — Oliff PLC

(57) ABSTRACT

An information processing apparatus includes a processing unit that performs a process, and a notification unit that is adapted to notify a display of a status of the process for the display to display the status, performs first communication from the information processing apparatus to the display if the status as a notification target occurs, and notifies the display of the occurring status by second communication to transmit a hypertext transfer protocol (HTTP) response in response to an HTTP request from the display to which the first communication has been performed.

14 Claims, 17 Drawing Sheets

FIG. 6

| | | | | |
|---|---|---|---|---|
| READY TO COPY | | | | START COPYING |

| COPY | IMAGE QUALITY | READING METHOD | OUTPUT FORMAT | EDITING JOB |
|---|---|---|---|---|

| SELECT MAGNIFICATION | SELECT PAPER TYPE | SELECT COLOR MODE |
|---|---|---|
| 110%  − + | AUTO | AUTO |
| 100% | SIZE A4 PLAIN PAPER | FULL-COLOR |
| 141% | SIZE A3 PLAIN PAPER | MONOCHROME |
| 70% | SIZE B4 PLAIN PAPER | TWO-COLOR |
| OTHER MAGNIFICATIONS | OTHER TRAY | OTHER COLOR MODE |

NOW COPYING

NUMBER OF COPIES : 1/3  ← C11
PAGE NUMBER      : 2/10

MONOCHROME
A4
100%     ← C12
SORT

COPIED

NUMBER OF COPIES : 3/3  ← C21
PAGE NUMBER      : 10/10

MONOCHROME
A4
100%     ← C12
SORT

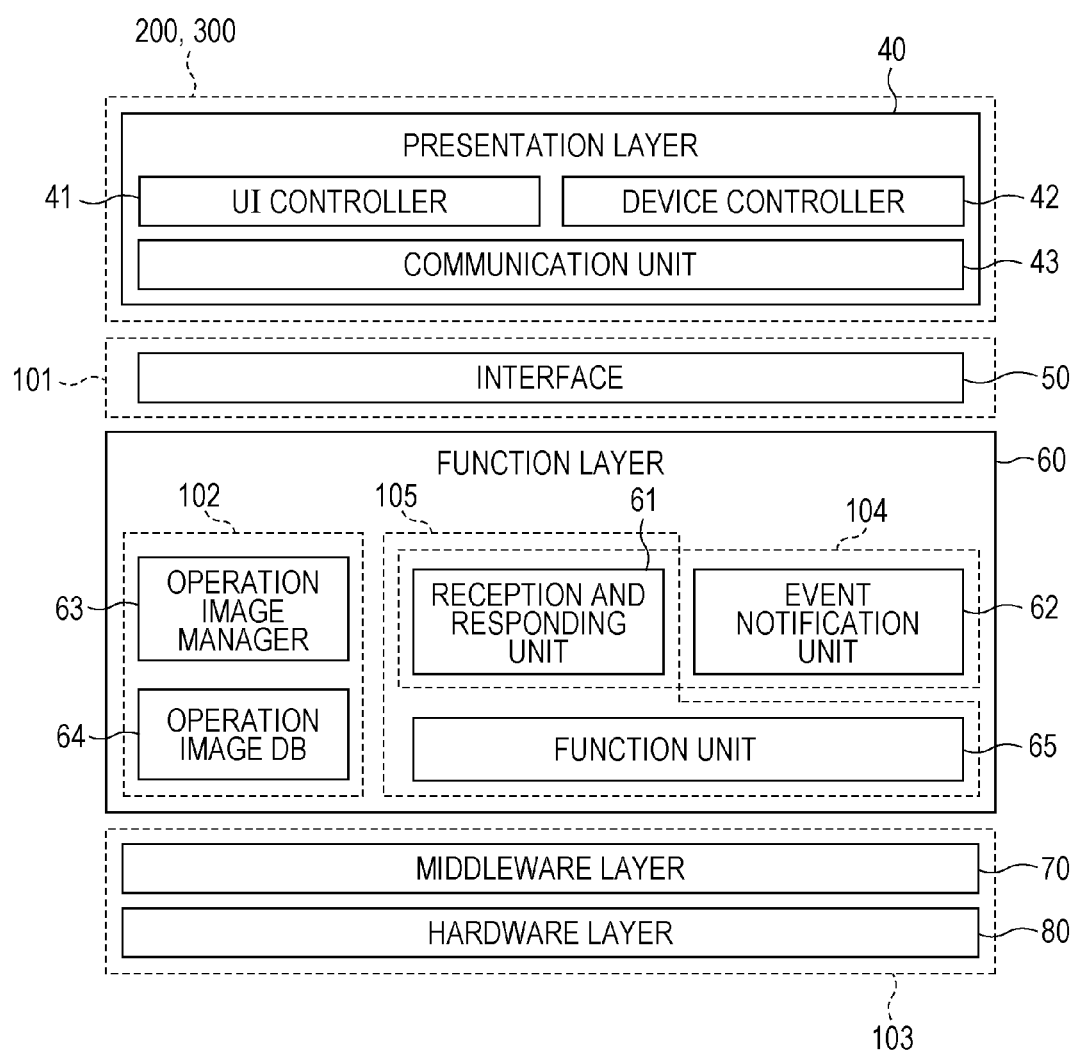

INFORMATION PROCESSING APPARATUS, INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-193646 filed Sep. 24, 2014.

BACKGROUND

Technical Field

The present invention relates to an information processing apparatus, an information processing system, an information processing method, and a non-transitory computer readable medium.

SUMMARY

According to an aspect of the invention, there is provided an information processing apparatus. The information processing apparatus includes a processing unit that performs a process, and a notification unit that is adapted to notify a display of a status of the process for the display to display the status, performs first communication from the information processing apparatus to the display if the status as a notification target occurs, and notifies the display of the occurring status by second communication that is to transmit a hypertext transfer protocol (HTTP) response in response to an HTTP request from the display to which the first communication has been performed.

BRIEF DESCRIPTION OF THE DRAWINGS

Exemplary embodiments of the present invention will be described in detail based on the following figures, wherein:

FIG. 6 illustrates an example of a displayed operation image;

FIG. 7A and FIG. 7B illustrate examples of displayed status information;

FIG. 10 illustrates an example of a layered structure representing the configuration of the information processing system;

DETAILED DESCRIPTION

The general configuration, hardware configuration, and functional configuration of an information processing system of an exemplary embodiment are described below with reference to FIG. 1 through FIG. 12.

Figure 1:
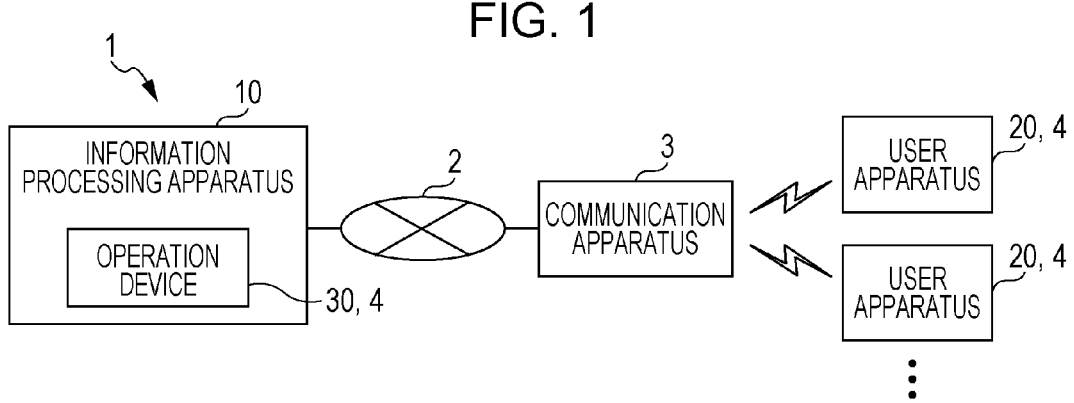
FIG. 1 is a block diagram generally illustrating an information processing system of an exemplary embodiment.

FIG. 1 is a block diagram generally illustrating an information processing system 1 of the exemplary embodiment. Referring to FIG. 1, the information processing system 1 includes a communication network 2, a communication apparatus 3, an information processing apparatus 10, and multiple user apparatuses 20. In the exemplary embodiment, the information processing system 1 provides a user with a copy function, a scan function, a fax (facsimile) function, and a print function (such as outputting image data to a medium).

The communication network 2 includes at least one of the Internet, a mobile communication network, and a telephone network. The communication network 2 interfaces for communications among apparatuses connected thereto. The communication network 2 is connected to the information processing apparatus 10 and the communication apparatus 3. The communication apparatus 3 may be a router, a hub, or an access point to interface for communications. In the exemplary embodiment, the communication apparatus 3 is an access point, and performs wireless communications in accordance with wireless LAN standards.

The communication apparatus 3 wirelessly communicates with the information processing apparatus 10 via the communication network 2 while wirelessly communicating with the user apparatus 20. In other words, the information processing apparatus 10 communicates with the user apparatus 20 via a communication system, such as the communication network 2, and an external communication apparatus, such as the communication apparatus 3. The communication apparatus 3 is an example of a communication apparatus to which the user apparatus 20 is connected. The user apparatus 20 may communicate with the information processing apparatus 10 via another communication apparatus. The "other communication apparatus" does not include the information processing apparatus 10 and the operation device 30. In the discussion that follows, the "other communication apparatus" refers to a communication apparatus is none of the information processing apparatus 10, the user apparatus 20, and the operation device 30.

The information processing apparatus 10 performs an image processing process to form an image on a medium and an image reading process to read an image formed on a medium. These processes are performed when the copy function, the scan function, the fax function, or the print function is provided to the user. The information processing apparatus 10 includes the operation device 30 that is used to operate the information processing apparatus 10. The operation device 30 is thus a device to operate the information processing apparatus 10. The operation device 30 is mounted on the housing of the information processing apparatus 10. The operation device 30 is used by a user who approaches the information processing apparatus 10 to use the information processing apparatus 10. The operation device 30 may include a liquid-crystal display, for example, and display an image to operate the information processing apparatus 10 (hereinafter referred to as an "operation image"). The operation image is described with reference to FIG. 6.

FIG. 6 illustrates an example of a displayed operation image. In the example of FIG. 6, an operation image group A1 to use the copy function is illustrated. The operation image group A1 includes an operation image A11 to start copying. By tapping the operation image A11, the user performs an operation corresponding to the operation image A11, namely, an operation to start copying. When the operation corresponding to the displayed operation image is performed, the operation device 30 the information processing apparatus 10 makes a request responsive to the operation. If an operation is performed on the operation image A11, the operation device 30 requests the information processing apparatus 10 to perform a process to provide the copy function (more specifically, a series of operations including an image reading operation and an image forming operation, and hereinafter referred to as a "copy process").

The user apparatus 20 displays the operation image. If an operation is performed on the displayed operation image, the user apparatus 20 requests the information processing apparatus 10 to perform a process responsive to the operation. In that sense, the user apparatus 20 is identical to the operation device 30. The user apparatus 20 may be a tablet terminal or a personal computer. The user apparatus 20 may be carried and used by the user or may be used in an installed state, such as in a table-top mode. The user apparatus 20 is not limited to the operation of the information processing apparatus 10 and may be used for other applications (for business use in an office in a company).

The information processing apparatus 10 performs the process in response to the request from the user apparatus 20 or the operation device 30. The information processing apparatus 10 notifies the user apparatus 20 or the operation device 30 of the status of the process by transmitting to the user apparatus 20 or the operation device 30 information indicating the status of the process in progress (hereinafter referred to as "status information").

FIG. 7A and FIG. 7B illustrate examples of the displayed status information. If the copy process is complete, the information processing apparatus 10 transmits status information C1 including quantity information C11, such as the number of completed copies (page count and page number), and a character string "now copying", and copying parameters such as "monochrome", "A4", "100%", and "sort" as illustrated in FIG. 7A.

When the copy process is in progress and then a the requested number of copies has been made, the information processing apparatus 10 transmits status information C2 including quantity information C21 representing the completion of the requested number of copies, and a character string "copied" as illustrated in FIG. 7B. The quantity information C11 and C21 is represented by a fraction with the request number of copies as a denominator and the completed number of copies as a numerator. The status information includes information indicating the progress of the process, the results of the process, and parameters used in the process. Each of the user apparatus 20 and the operation device 30 displays the notified status as illustrated in FIG. 7A and FIG. 7B. In the discussion that follows, the user apparatus 20 and the operation device 30 may be collectively referred to as a display 4 if there is no need to discriminate one from the other.

Figure 2:
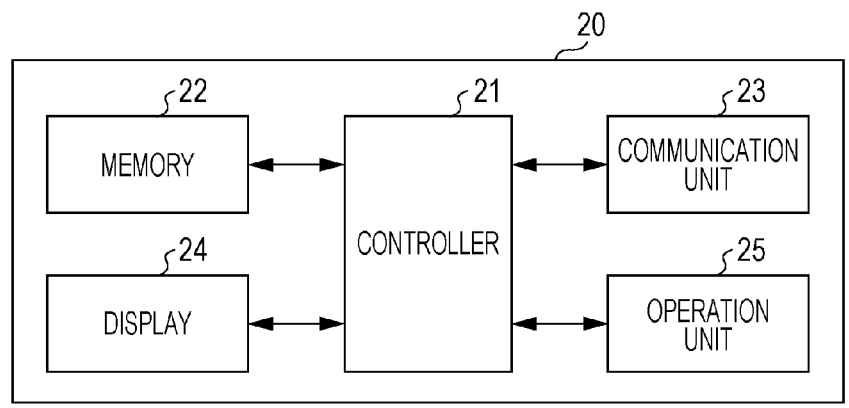
FIG. 2 is a block diagram illustrating an example of the hardware configuration of a user apparatus.

FIG. 2 is a block diagram illustrating an example of the hardware configuration of the user apparatus 20. The user apparatus 20 is a computer that includes a controller 21, a memory 22, a communication unit 23, a display 24, and an operation unit 25. The controller 21 includes a central processing unit (CPU), a read-only memory (ROM), a random-access memory (RAM), and a real-time clock. The CPU uses the RAM as a working area and executes a program stored on the ROM or the memory 22, thereby controlling the operation of each of these elements of the user apparatus 20. The real-time clock calculates the present date and time and notifies the CPU of the present date and time.

The memory 22 includes a hard disk, and stores data, program, and image data, used by the controller 21. The communication unit 23 includes a communication circuit for use in wireless communications complying with wireless local area network (LAN) standards and antenna. For example, the communication unit 23 performs wireless communications with the communication apparatus 3 of FIG. 1. More specifically, the communication unit 23 is a communication apparatus other than the communication apparatuses described above (including the information processing apparatus 10, the user apparatus 20, and the operation device 30). For example, the communication unit 23 may be the communication apparatus 3. The display 24 may include a liquid-crystal display, and displays an image on the display screen under the control of the controller 21.

If the user apparatus 20 is a tablet terminal, the operation unit 25 includes buttons arranged on the housing thereof and a touch sensor (also referred to as a touch screen or a touchpanel) overlaid on the display screen. The operation unit 25 receives a user operation, such as tapping, and transfers to the controller 21 operation data indicating the contents of the operation. If the user apparatus 20 is a personal computer, the operation unit 25 may include a keyboard or a mouse. The controller 21 performs a control operation responsive to the supplied operation data.

Figure 3:
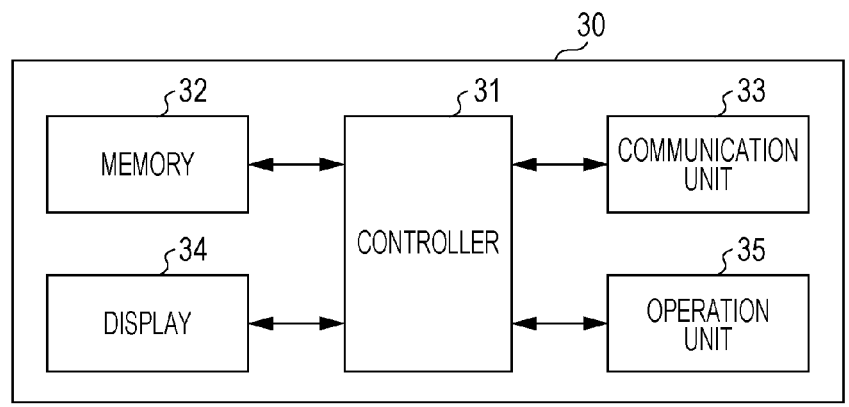
FIG. 3 is a block diagram illustrating an example of the hardware configuration of an operation device.

FIG. 3 is a block diagram illustrating an example of the hardware configuration of the operation device 30. The operation device 30 is a computer that includes a controller 31, a memory 32, a communication unit 33, a display 34, and an operation unit 35. The blocks (other than the communication unit 33) indicating hardware similar to the hardware of each of the blocks in FIG. 2 have the same names and the discussion thereof is omitted. The communication unit 33 includes a communication circuit for communications complying with the wireless LAN standards and a port that receives a connector of a communication cable (more specifically, a LAN cable). The communication unit 33 directly communicates with the information processing apparatus 10 without the other communication apparatus described above included therebetween.

Figure 4:
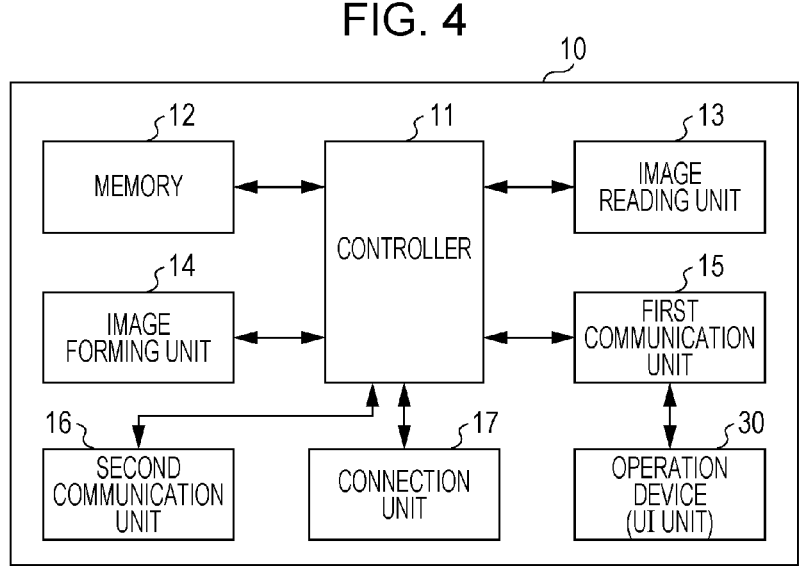
FIG. 4 is a block diagram illustrating an example of the hardware configuration of an information processing apparatus.

FIG. 4 is a block diagram illustrating an example of the hardware configuration of the information processing apparatus 10. The information processing apparatus 10 is a computer that includes a controller 11, a memory 12, an image reading unit 13, an image forming unit 14, a first communication unit 15, a second communication unit 16, and a connection unit 17. The blocks (the controller 11 and the memory 12) indicating hardware similar to the hardware of each of the blocks in FIG. 2 and FIG. 3 have the same names and the discussion thereof is omitted. The information processing apparatus 10 also includes the operation device 30 working as a user interface (UI). The controller 11 controls each element in the information processing apparatus 10 other than the operation device 30.

The image reading unit 13 performs an image reading process to read an image on an original document using a charge-coupled device (CCD) system. The image reading unit 13 optically reads an image formed on a medium, such a paper sheet, and transfers image data representing the read image to the controller 11. The image forming unit 14 performs an image forming process to form an image on a medium using an electrophotographic system. The image forming unit 14 forms in a medium, such as a paper sheet, an image indicated by the image data supplied from the controller 11. The systems used to read the image and form the image have been described for exemplary purposes only, and a different system may be used instead.

The first communication unit 15 includes a communication circuit to communicate in accordance with the wireless LAN standards, and a port that receives a connector of a communication cable (such as a LAN cable). The first communication unit 15 performs a communication process with an apparatus connected thereto via the cable. The first communication unit 15 is connected to the communication network 2 of FIG. 1, and communicates with the user apparatus 20 via an external device (such as the communication apparatus 3 external to the information processing apparatus 10). The first communication unit 15 may also be connected to the communication unit 33 in the operation device 30 via a communication cable and communicates with the operation device 30 without the external device. More specifically, the communication unit 33 communicates with the information processing apparatus 10 without the external device.

The second communication unit 16 includes a communication circuit to perform facsimile (fax) communication, and exchanges fax data, namely, performs a fax communication process. The connection unit 17 includes a slot that receives a storage medium, such as a secure digital (SD) memory card, and is thus connected to such a storage medium. The controller 11 reads data from the storage medium or writes data onto the storage medium. The operation device 30 is configured as illustrated in FIG. 3, and communicates with the first communication unit 15. By communicating with the first communication unit 15, the operation device 30 works as a user interface (UI) unit. The UI unit displays an image indicated by data transmitted from the controller 11 or transmits to the controller 11 data to operate the information processing apparatus 10.

The controllers of the information processing apparatus 10, the user apparatus 20, and the operation device 30 perform the programs stored on the memories thereof to control the elements thereof. The functions described below are thus implemented.

Figure 5:
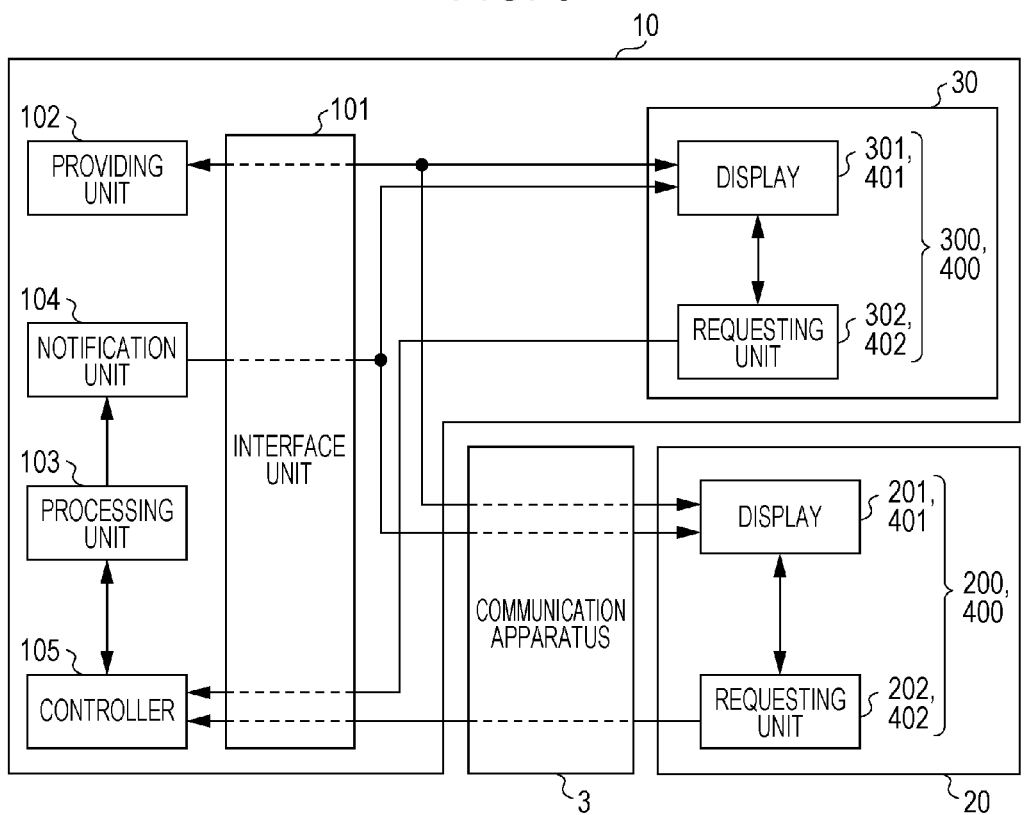
FIG. 5 is a functional block diagram illustrating the information processing system.

FIG. 5 is a functional block diagram illustrating the information processing system 1. The information processing apparatus 10 includes an interface unit 101, a providing unit 102, a processing unit 103, a notification unit 104, and a controller 105. The operation device 30 includes an operation unit 300. The user apparatus 20 includes an operation unit 200.

The interface unit 101 in the information processing apparatus 10 interfaces for communications between the information processing apparatus 10 and the display device 4. More in detail, the interface unit 101 interfaces for communications with the display device 4 (the user apparatus 20 in the exemplary embodiment) connected to the information processing apparatus 10 via the other communication apparatus (such as the communication apparatus 3). The interface unit 101 also interfaces for communications with the display device 4 (the operation device 30 in the exemplary embodiment) connected to the information processing apparatus 10 without using the other communication apparatus. A communication procedure (or a communication protocol) used by the interface unit 101 is described below.

The interface unit 101 interfaces for communications complying with the standard of world wide web (WWW) between the display device 4 (the user apparatus 20 and the operation device 30) and the information processing apparatus 10. The interface unit 101 complies with simple object access protocol (SOAP) from among web standards, and for example, interfaces for communications described by extensive markup language (XML) (hereinafter referred to as "XML data"). The interface unit 101 receives the XML data indicating a hypertext transfer protocol (HTTP) request transmitted from the display device 4, and then transfers the HTTP request to the providing unit 102. The interface unit 101 receives XML data indicating a HTTP response supplied from the providing unit 102 in response and then transmits the HTTP response to the display device 4.

The interface unit 101 also complies with the WebSocket standard. Upon establishing connection with the display device 4 through a transmission control protocol (TCP) handshake in accordance with the WebSocket standard, the interface unit 101 not only communicates the XML data indicating the HTTP request and the HTTP response, but also interfaces for transmission of XML data to the display device 4 at any timing from the providing unit 102. In this way, the information processing system 1 performs not only pull-based communication responsive to the HTTP request transmitted from the display device 4 but also push-based communication transmitted from the information processing apparatus 10.

The interface unit 101 interfaces for communications of the providing unit 102, the notification unit 104, the controller 105, the displays 201 and 301 (referred to as a display 401 if the displays 201 and 301 are not discriminated from each other), the requesting units 202 and 302 (referred to as a requesting unit 402 if the requesting units 202 and 302 are not discriminated from each other). More specifically, the interface unit 101 interfaces for the communication performed between each of the providing unit 102 and the notification unit 104 in the information processing apparatus 10 and the display 401 in the display device 4, and the communication performed between the requesting unit 402 in the display device 4 and the controller 105 in the information processing apparatus 10. In each case, the interface unit 101 interfaces for the communication with each of the user apparatus 20 and the operation device 30 in accordance with a common communication procedure (the communication procedure complying with WWW, SOAP, or WebSocket).

The providing unit 102 in the information processing apparatus 10 provides the above described operation image to the display device 4 via the interface unit 101. The providing unit 102 provides the operation image to the user apparatus 20 via the communication by the interface unit 101 and the other communication apparatus. The providing unit 102 also provides the operation image to the operation device 30 via the communication by using the interface unit 101 but without using the other communication apparatus.

The providing unit 102 stores the operation image (the image data representing the operation image). When the XML data indicating the HTTP request (hereinafter referred to as "operation image requesting data") requesting the operation image is received via the interface unit 101, the providing unit 102 transmits to the requester via the interface unit 101 XML data indicating an HTTP response including the operation image requested by that XML data (hereinafter referred to as "operation image data").

If the operation image requesting data is received from the user apparatus 20, the providing unit 102 transmits the operation image data to the user apparatus 20 in response. If the operation image requesting data is received from the operation device 30, the providing unit 102 transmits the operation image data to the operation device 30 in response. The providing unit 102 provides the operation image to each requester by transmitting the operation image data to the requester of the operation image (the user apparatus 20 or the operation device 30).

The processing unit 103 in the information processing apparatus 10 executes a process. The processing unit 103 performs in addition to the copy process, a scan process, a fax process, and a print process (respectively, processes to perform the scan function, the fax function, and the print function). The copy process includes an image reading process by the image reading unit 13 and an image forming process by the image forming unit 14 illustrated in FIG. 4. The scan process includes the image reading process. The fax process includes a fax process by the second communication unit 16. The print process includes a communication process by the first communication unit 15 and the image forming process. Depending on the acquisition and output method of data, the scan process and the fax process may include a data communication process by the second communication unit 16, a write process of writing data onto the memory 12, and a reading process of reading data from the memory 12.

A variety of statuses may occur when the processing unit 103 executes the process. For example, in the copy process, an image may be read from an original document, transport of a medium may start, a toner image may be formed on a photoconductor body, and an image may be formed on the medium. The statuses of the copy process may also include a change in copy parameters, such as color setting, magnification rate, whether copies are to be sorted or not. If the process is executed in the exemplary embodiment, the processing unit 103 generates status information representing a status that is a target of notification, from among statuses, and then transfers the status information to the notification unit 104.

The statuses as a target of notification may include the number of completed copies, and the parameters including the sheet size as illustrated in FIG. 7A and FIG. 7B. The memory 12 in the information processing apparatus 10 stores a list of statuses as targets of notification. The processing unit 103 references the memory 12, and transfers to the notification unit 104 information representing the status included in the list from the status information representing the statuses of the processes. Regardless of whether information representing the status is included in the list or not, the processing unit 103 may transfer the status information to the notification unit 104 and the notification unit 104 may determine whether the supplied status information includes the status included in the list.

The notification unit 104 in the information processing apparatus 10 notifies the display device 4 of the status of the process executed by the processing unit 103, via the communication interfaced by the interface unit 101. In the exemplary embodiment, the notification unit 104 notifies the display device 4 of the status of the process using one of five notification methods of a first through fifth notification methods. In the first and second notification methods, the notification unit 104 notifies the display device 4 of the status of the process in response to a request from the display device 4. More specifically, upon receiving the HTTP request from the display device 4 via the interface unit 101, the notification unit 104 describes the status information transferred from the processing unit 103 on the HTTP response responsive to the HTTP request, and then transmits the HTTP response to the display device 4 via the interface unit 101. The notification unit 104 thus notifies the display device 4 of the status of the process.

In the first notification method, if the HTTP request has been received as a request of process (hereinafter referred to as a "process request") from the display device 4, the notification unit 104 waits on standby until the processing unit 103 has completed the process. The "process" request here is a process that is to be performed by the processing unit 103. The notification unit 104 describes a status of the completed process, namely, process results on the HTTP response responsive to the HTTP request having requested the process, and then transmits the HTTP response to the display device 4. The notification unit 104 thus notifies the display device 4 of the described process results.

In the second notification method, if the process request via the HTTP request has been received from the display device 4, the notification unit 104 does not wait until the completion of the requested process. The notification unit 104 first notifies the display device 4 of the reception of the process request via the HTTP response responsive to the HTTP request. If the HTTP request describing a request of notification of the status of the process (hereinafter referred to as a "notification request") has been received from the display device 4, the notification unit 104 describes the status information on the HTTP response responsive to the HTTP request and transmits the HTTP response. The notification unit 104 thus notifies the display device 4 of the status of the process.

The display device 4 repeatedly transmits the notification request using the HTTP request (polls the notification unit 104), and the notification unit 104 notifies the display device 4 of the status of the process in the response in reply to the notification request through the polling. In the exemplary embodiment, the display device 4 polls the notification unit 104 until the process results have been notified, and the notification unit 104 repeatedly notifies the display device 4 of the status of the process until notifying the process results.

In summary, if the first notification method is used, the notification unit 104 notifies the display device 4 of the process results in the HTTP response responsive to the HTTP request having requested the process. If the second notification method is used, the notification unit 104 notifies the display device 4 of the process results and the status of another process in a communication different from the communication using the HTTP response responsive to the HTTP request having requested the process, namely, in the HTTP response responsive to the HTTP request having requested the notification. If the first or second notification method is used in this way, the notification unit 104 notifies the display device 4 of the response responsive to the request from the display device 4 (the process request or the notification request). The notification unit 104 thus performs a pull-based notification.

If the third or fourth notification method is used, the notification unit 104 notifies the display device 4 of the status of the process via communication complying with a standard different from the HTTP response. More specifically, the notification unit 104 notifies the display device 4 of the status of the process using the communication complying with the WebSocket standard. In the third or fourth notification method, the operation image requesting data may be received from the display device 4, for example. The interface unit 101 performs a TCP handshake procedure, establishing connection between the information processing apparatus 10 and the display device 4. Upon receiving the status information from the processing unit 103, the notification unit 104 describes the status information on the XML data complying with the WebSocket standard. The notification unit 104 notifies the display device 4 of the status of the process by transmitting the XML data to the display device 4 via the interface unit 101.

If the process request by the HTTP request has been received from the display device 4 in the third notification method, the notification unit 104 notifies the display device 4 in the HTTP response responsive to the HTTP request that the process request has been received, without waiting for the completion of the requested process as in the second notification method. From then on, even if the notification request by the HTTP request is not received when the notification unit 104 receives the status information from the processing unit 103, the notification unit 104 transmits to the display device 4 the XML data describing the supplied status information. The notification unit 104 thus notifies the display device 4 as the requester of the process results and the status of the other process.

If the third notification method is used, the notification unit 104 notifies the display device 4 of the process results and the status of the other process in the communication (complying with the WebSocket standard in the exemplary embodiment) different from the communication using the HTTP response responsive to the HTTP request having made the process request. The third notification method is similar to the second notification method in that the status of the process and the status of the other process are notified using the communication different from the communication using the HTTP response responsive to the HTTP request having made the process request. The "different communication" in the second notification method is the HTTP response responsive to the HTTP request transmitted from the display device 4, namely, the HTTP request having requested the notification, separate from the HTTP request having made the process request.

In the fourth notification method, upon receiving the status information from the processing unit 103, the notification unit 104 transmits to the display device 4 the XML data describing the status information regardless of the presence or absence of the process request by the HTTP request from the display device 4. The notification unit 104 thus notifies the display device 4 as the requester of the status represented by the status information. In the fourth notification method, the notification unit 104 notifies the display device 4 of predetermined statuses including "running out of toner" or "running out of paper sheet". The notification unit 104 may notify each display device 4 of the status of a process individually predetermined for the display device 4.

If the third or fourth notification method is used, the notification unit 104 performs an active notification (push-based notification) regardless of the presence or absence (the process request and the notification request) by the HTTP request from the display device 4.

If the fifth notification method is used, the notification unit 104 notifies the display device 4 of the status of the process by making communications with the display device 4 twice. The communications are hereinafter referred to as first communication and second communication. If the status of the process occurs as the target of notification in the processing unit 103, the notification unit 104 originates the first communication from the information processing apparatus 10 (namely, in a push-based communication). The first communication serves as a trigger for the notification of the status of the process.

Upon receiving the status information from the processing unit 103 in the exemplary embodiment, the notification unit 104 describes on the XML data complying with the WebSocket standard that the fact that the status of the process serving as the target of notification has occurred, and then transmits the XML data to the display device 4 via the interface unit 101. The occurrence of the status of the process as the target of notification may be represented using a character string or a predetermined symbol. In this case, the notification unit 104 performs the transmission of the XML data as the first communication.

The occurrence of the status of the process may not necessarily have to be described on the XML data. For example, the XML data that is set to be data to be transmitted if the status of the process as the target of notification occurs may be transmitted. Alternatively, data predetermined in accordance with the communication protocol, such as file transfer protocol (FTP), or file transfer protocol over SSL/TLS (FTPS), may be transmitted. Any type of the first communication may be performed as long as the display device 4 or the user of the display device 4 is notified that the status of the process as the target of notification has occurred.

Upon receiving the XML data transmitted via the first communication, the display device 4 transmits the HTTP request describing the request to notify of the status as described below. The display device 4 thus makes the notification request. Upon receiving the HTTP request via the interface unit 101, the notification unit 104 describes the status information supplied from the processing unit 103 onto the XML data, and then transmits to the display device 4 the XML data as the HTTP response responsive to the HTTP request. The notification unit 104 transmits the HTTP response as the second communication. The notification unit 104 thus notifies the display device 4 of the generated status of the process by the second communication that transmits the HTTP response responsive to the HTTP request from the display device 4 with which the first communication has been performed.

As described above, by the first communication, the notification unit 104 notifies the display device 4 that the status of the process as the target of notification has occurred, and by the second communication, the notification unit 104 notifies the display device 4 of the status of the process. This notification process is hereinafter referred to as a "first notification". If the fifth notification method is used, the notification unit 104 performs a second notification in addition to the first notification. If the status of the process as the target of notification occurs, the notification unit 104 notifies the display device 4 of the status of the process by originating the third communication (namely, the push-based communication) without performing the first communication in the second notification.

Upon receiving the status information from the processing unit 103 in the third or fourth notification method in the second notification, the notification unit 104 describes the status information on the XML data complying with the WebSocket standard, and transmits the XML data to the display device 4 via the interface unit 101. The notification unit 104 thus notifies the display device 4 of the status of the process. The use of the WebSocket standard allows the push-based third communication to notify the display device 4 of the state of the process without performing the pull-based communication responsive to the HTTP request from the display device 4. Depending on the generated status of the process, the notification unit 104 performs the first notification or the second notification.

In the exemplary embodiment, the notification unit 104 determines whether to perform the first notification or the second notification depending on the type of the generated status. For example, the processing unit 103 may now perform the copy process. When an original document is read, the status information including a thumbnail image of the read original document is supplied to the notification unit 104. When a copy (the image of the read original document) is output to a medium, the number of completed copies is supplied to the notification unit 104 as the status information. In this case, the notification unit 104 performs the first notification for the thumbnail image of the original document, and performs the second notification for the number of media.

The operation unit 200 in the user apparatus 20 and the operation unit 300 in the operation device 30 (also referred to as an operation unit 400 if the operation unit 200 and the operation unit 300 are not discriminated from each other) are used to operate the information processing apparatus 10. The operation unit 400 is implemented by the display device 4 when the display device 4 executes a browser program. The operation unit 200 includes a display 201 and a requesting unit 202. The operation unit 300 includes a display 301 and a requesting unit 302. If the user apparatus 20 and the operation device 30 are not discriminated from each other, the display and the requesting unit thereof are respectively referred to as a display 401 and a requesting unit 402.

The display 401 (the display 201 in the user apparatus 20 or the display 301 in the operation device 30) displays information and image transmitted from the information processing apparatus 10. For example, the display 401 displays the status information (information representing the results of the process and the status of another process) described on the XML data transmitted from the notification unit 104 in the information processing apparatus 10. For example, the display 401 displays the status information C1 and C2 described with reference to FIG. 7A and FIG. 7B. Other examples of the status information are described with reference to FIG. 8, FIG. 9A and FIG. 9B.

Figure 8:
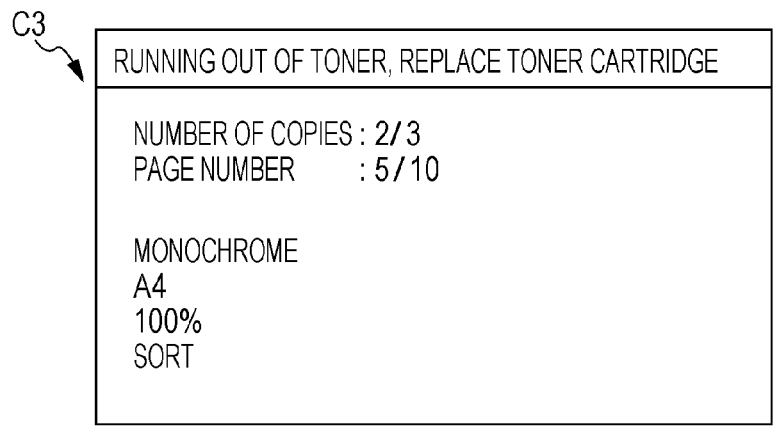
FIG. 8 illustrates an example of the displayed status information.

FIG. 8 illustrates an example of the display status information. In this example, the status information indicates an out-of-toner status. More specifically, status information C3 including a character string reading "running out of toner, replace toner cartridge" is displayed.

Figure 9A:
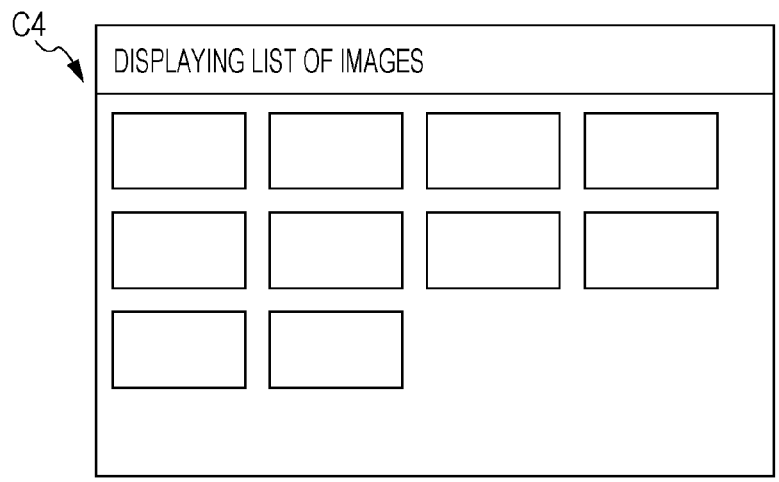
FIG. 9A and FIG. 9B illustrate other examples of the displayed status information.
Figure 9B:
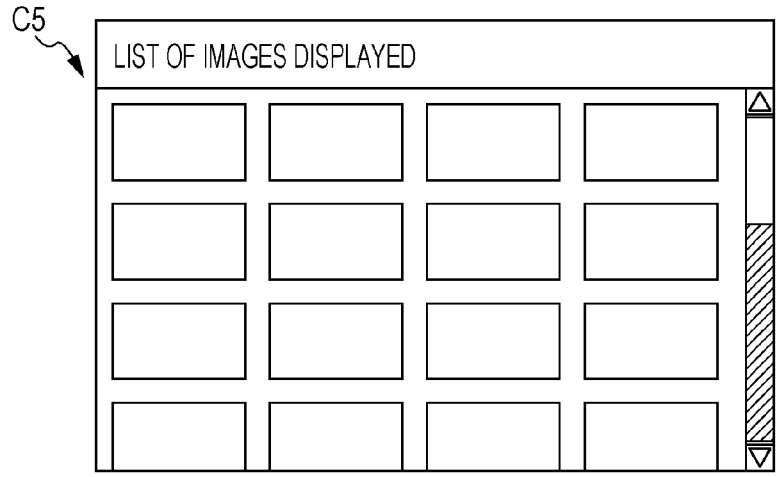

FIG. 9A and FIG. 9B illustrate other examples of the display status information. In this example, a storage medium, such as a SD memory card, storing multiple images is connected to the connection unit 17 in the information processing apparatus 10 of FIG. 4, and the status of a process of displaying a list of thumbnail images of the images stored on the storage medium and results of the process are displayed. As illustrated in FIG. 9A, the display 401 displays a character string "displaying list of images", and status information C4 including thumbnail images generated from the read images (ten thumbnail images in this case). As illustrated in FIG. 9B, the display 401 displays a character string reading "list of images displayed" and status information C5 including a list of thumbnail images generated from all the images read from the storage medium.

When the user accesses a uniform resource locator (URL) of the information processing apparatus 10, the display 401 transmits the operation image requesting data to the information processing apparatus 10. The display 401 displays the operation image indicated by the operation image data transmitted from the providing unit 102 in the information processing apparatus 10 in response. More specifically, the display 401 displays the operation image based on parameters, such as the location and size of the operation image described in the HTTP response indicated by the operation image data. The operation image thus displayed is an operation image group A1 of FIG. 6, for example.

The operation image group A1 includes an operation image A11 responsive to a request to start copying, and operation image groups A12, A13, and A14 for selecting the magnification of the image to be copied, a paper sheet on which to form the copied image, and a color mode of the image to be copied. The operation image group A12 includes an operation image A15 responsive to a request to increase the magnification of copying in steps of 1%, and an operation image A16 responsive to a request to decrease the magnification of copying in steps of 1%. The operation image group A1 also includes operation images that allow tags such as "image quality adjustment", "reading method", "output format", and "editing job" to be selected.

The operation image groups A12, A13, and A14 include operation images that allows to be selected parameters that are transferred to the processing unit 103 when the copy function is used. The operation image A11 is used to request a process to be performed using a selected parameter when an operation is made on an image of interest. More specifically, the operation image A11 is used to determine the contents of a request. The display 401 displays these operation images in accordance with the operation image data.

The display 401 displays an image that is used to transfer to the user the contents of a currently selected parameter (hereinafter referred to as a "parameter transfer image"). For example, the display 401 displays as a parameter transfer image a character string indicating the currently selected magnification of copying ("110%" in this case) in a screen region B11. The display 401 also displays as a parameter transfer image an operation image representing the currently selected paper sheet and color mode (character strings "other magnifications", "size A4 plain paper", and "monochrome" in this case) in a form (using heavier outline, in this case, and a highlighted form may also be acceptable) different from a form of unselected images. The display 401 displays the parameter transfer image in response to operations performed on the operation image (for example, the operation image A15 or A16) from which parameters are to be selected.

The display 401 supplies data related to the displayed operation image to the requesting unit. The data related to the displayed operation image is used to determine whether the operation image has been operated or not, and indicates a region where the operation image is displayed (hereinafter referred to as an "operation image region"). The display 401 also supplies, to the requesting unit, data related to the displayed parameter transfer image. The data related to the displayed parameter transfer image is used to indicate the contents of a parameter to be transferred to the parameter transfer image.

When the user makes an operation on the operation image, the requesting unit 402 (the requesting unit 202 in the user apparatus 20 or the requesting unit 302 in the operation device 30) makes to the information processing apparatus 10 a request corresponding to the user operation through the HTTP request. The requesting unit 402 requests the processing unit 103 to perform the process (the process request), and requests the information processing apparatus 10 to notify the status of the process and the results of the process (notification request) in response to the user operation.

When the user taps a touch sensor of the operation unit, the requesting unit 402 determines whether the tapped location is within an operation image region based on data supplied from the display 401. Upon determining that the tapped location is within the operation image region, the requesting unit 402 receives an operation on the operation image displayed in the operation image region. When an operation on an instruction content determination image (such as the operation image A11 in FIG. 6) is received, the requesting unit 402 requests the information processing apparatus 10 to perform the process indicated by the instruction content determination image, using a parameter indicated by the data related to the parameter transfer image supplied from the display 401. If an operation is performed on the operation image A11 in the state of FIG. 6, the requesting unit 402 requests the information processing apparatus 10 to perform monochrome copying on an A4 sheet size plain sheet at a magnification of 110%.

More specifically, the requesting unit 402 generates XML data indicating an HTTP request. The HTTP request describes an instruction to perform a process corresponding to the operated instruction content determination image (the copy process in this case) using a parameter transferred via the parameter transfer image (the instruction is hereinafter referred to as a job order). The requesting unit 402 requests the information processing apparatus 10 to perform the process by the HTTP request by transmitting the XML data to the information processing apparatus 10. The XML data that the requesting unit 402 transmits to request the process is hereinafter referred to as "process request data". If the copy process is requested, the process request data including a job order is generated. Depending on the requested process, no job order is included in the process request data. For example, if a process to shut down the power of the information processing apparatus 10 is requested, no job order is included in the process request data.

When the requesting unit 402 transmits the HTTP request, an HTTP response is returned in response. The requesting unit 402 performs a series of processes to transmit the HTTP request and receive the HTTP response. During the series of processes, no operation from the user is accepted. For example, the operation image group A1 of FIG. 6 may now be displayed. Even if the user taps the operation image, the tapped location is not identified. In other words, the requesting unit 402 stays in a state that receives no operation from the user (in a freeze state) until the HTTP response responsive to the HTTP request transmitted by the requesting unit 402 is received. Once the requesting unit 402 receives the HTTP response, the requesting unit 402 is ready to receive an operation from the user again.

In order to request the process, the requesting unit 402 specifies a notification method of notifying the status of the process, and requests the status of the process to be notified through the specified notification method. More specifically, the requesting unit 402 specifies one of the first, second, third, and fifth notification methods to be used.used. The requesting unit 402 describes the specified notification method on the process request data, and then transmits the process request data. The notification unit 104 in the information processing apparatus 10 notifies the status of the process using the notification method specified in the process request data. Alternatively, the requesting unit 402 may describe the specified notification method on the XML data different from the process request data and transmit the XML data as an HTTP request to the display device 4. In such a case, the notification unit 104 notifies in the HTTP response responsive to the HTTP request that the notification method is specified, and performs the notification through the specified notification method thereafter.

If the fifth notification method is used, the requesting unit 402 performs the first communication to notify the information processing apparatus 10 that the status of the process has occurred, and requests the information processing apparatus 10 to notify the requesting unit 402 of the status. More specifically, the display device 4 receives from the notification unit 104 in the information processing apparatus 10 the XML data (complying with the WebSocket standard) that describes the occurrence of the status of the process. The requesting unit 402 generates an HTTP request describing the request to notify the status based on the received XML data, and then transmits the HTTP request to the information processing apparatus 10. In this way, the requesting unit 402 requests the information processing apparatus 10 to notify the status of the process notified through the first communication.

When the first communication is made, the requesting unit 402 may or may not transmit the HTTP request. In the exemplary embodiment, the requesting unit 402 transmits the HTTP request if a predetermined operation is performed subsequent to the first communication, but does not transmit the HTTP request if the predetermined operation is not performed subsequent to the first communication. The predetermined operation is described in detail below.

If the display device 4 requests the information processing apparatus 10 to make a process in response to an operation performed on the operation image (such as the operation image A11 of FIG. 6), the controller 105 in the information processing apparatus 10 controls the processing unit 103 to perform the requested process. More specifically, if the process request data is received from the display device 4 via the interface unit 101, the controller 105 controls the processing unit 103 to perform the process requested by the process request data. In other words, when the process is requested through the HTTP request by the display device 4, the controller 105 controls the processing unit 103 to perform the requested process. The process request data as the XML data transmitted as the HTTP request from the display device 4 is interfaced by the interface unit 101 and then supplied to the controller 105.

The controller 105 analyzes the job order included in the process request data and controls the processing unit 103 such that the process is performed in accordance with the contents of the instruction as an analysis result of the job order. More specifically, the controller 105 executes the instructed process (such as the copy process) in accordance with the instructed parameter. The processing unit 103 thus reads an image from a medium in accordance with an image quality and an image reading method, specified by the operation of the user, and forms the read image in an output format, magnification, paper sheet, and color mode specified by the operation of the user.

The controller 105 issues a transaction identification (ID) as information identifying the process when the process is performed. The controller 105 associates the issued transaction ID with a destination of communication of the display device 4 as the requester, and then stores the issued transaction ID and the destination of communication in an associated state on the memory 12. In order to perform the process, the controller 105 supplies the issued transaction ID to the processing unit 103, and the processing unit 103 supplies the transaction ID together with the status information to the notification unit 104.

The controller 105 stores the notification method described on the process request data (one of the first through third notification methods) and the transaction ID in association with each other. The notification unit 104 transmits the XML data describing the status information supplied together with the transaction ID to the destination of the communication associated with the transaction ID supplied from the processing unit 103. The notification unit 104 transmits the XML data in the notification method associated with the transaction ID, thereby performing the notification in the specified notification method.

The layered structure of the information processing system 1 is described with reference to FIG. 10 and FIG. 11.

FIG. 10 illustrates an example of the layered structure representing the configuration of the information processing system 1. The information processing system 1 includes a presentation layer 40, an interface 50, a function layer 60, a middleware layer 70, and a hardware layer 80. The presentation layer 40 serves as a layer where a function of receiving an operation from the user (user interface function) is performed. The presentation layer 40 thus works as the operation unit 400 of FIG. 5.

The presentation layer 40 includes the user interface (UI) controller 41, a device controller 42, and a communication unit 43. The UI controller 41 controls the user interface, displays the operation image and the status information, and receives an operation from the user. The UI controller 41 is implemented by the display 401 of FIG. 5. The device controller 42 requests the information processing apparatus 10 to perform the process in response to the operation of the user, and controls the function layer 60 described below. The device controller 42 is implemented by the requesting unit 402. The communication unit 43 controls the communication that the UI controller 41 and the device controller 42 perform with the information processing apparatus 10.

The interface 50 is a layer that performs the function of interfacing for the connection between the presentation layer 40 to the function layer 60. The connection between the presentation layer 40 and the interface 50 may be performed using an external device, such as the communication apparatus 3 having the communication function as illustrated in FIG. 1 (for connection with the user apparatus 20) or may be performed not using such an external device (for connection with the operation device 30). The function layer 60 is used to implement a function of processing data for use in a target application, such as a copy function or a scan function. The middleware layer 70 is used to perform an intermediate and general-purpose process between the function layer 60 and the hardware layer 80. The hardware layer 80 is used to physically implement a process, such as image reading or image forming.

The function layer 60 includes a reception and responding unit 61, an event notification unit 62, an operation image manager 63, an operation image DB 64, and a function unit 65 that provides the copy function and the scan function. The reception and responding unit 61 receives the request of the process indicated by the process request data transmitted from the presentation layer 40 via the interface 50, and requests the function unit 65 to perform the process. The reception and responding unit 61 also issues the transaction ID. The reception and responding unit 61 transmits response data indicating a response to the received request to the presentation layer 40 via the interface 50. The response data may simply indicate the reception of the request or may also indicate the status information. More specifically, the reception and responding unit 61 may notify the status of the process, and the notification may be a pull-based notification based on the first and second notification methods.

The event notification unit 62 receives the status information via the function unit 65. The event notification unit 62 describes the supplied status information on the XML data complying with the WebSocket standard, and then transmits the XML data to the presentation layer 40 via the interface 50. In other words, the notification performed by the event notification unit 62 is a push-based notification based on the third or fourth notification method. The operation image manager 63 manages the operation image to be transmitted to the presentation layer 40. The operation image DB 64 is a database that stores the operation image. The function unit 65 is a module group that implements the function that the information processing apparatus 10 provides to the user.

Figure 11:
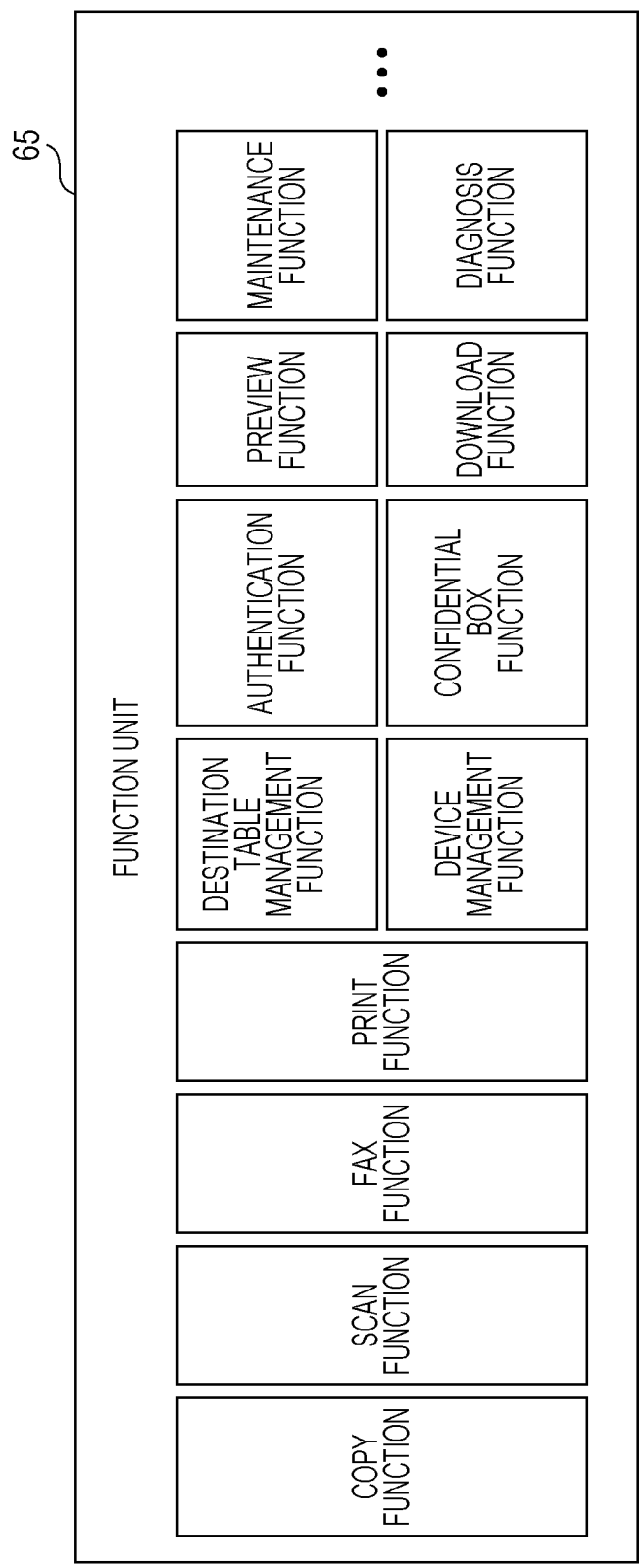
FIG. 11 illustrates an example of a module group included in a function unit.

FIG. 11 illustrates an example of the module group included in the function unit 65. The function unit 65 includes modules that implements a copy function, a scan function, a fax function, a print function, a destination table management function (a function of managing destination information), a device management function (a function of managing the original document setting state of the image reading unit 13, and the state of a medium and consumable supplies on the image forming unit 14), an authenticating function, a confidential box function (a function of managing digital text stored on the information processing apparatus 10), a preview function, a download function (a function of controlling updating of a program), a maintenance function (a function of maintaining hardware in response to a request from a remote control), and a diagnostic function (a function of diagnosing the hardware).

The interface 50 of FIG. 10 works as the interface unit 101 of FIG. 5. The operation image manager 63 and the operation image DB 64 cooperate with each other, thereby working as the providing unit 102. The middleware layer 70 and the hardware layer 80 cooperate with each other, thereby working as the processing unit 103. The reception and responding unit 61 and the event notification unit 62 cooperate with each other, thereby working as the notification unit 104. The reception and responding unit 61 and the function unit 65 cooperate with each other, thereby working as the controller 105.

Figure 12:
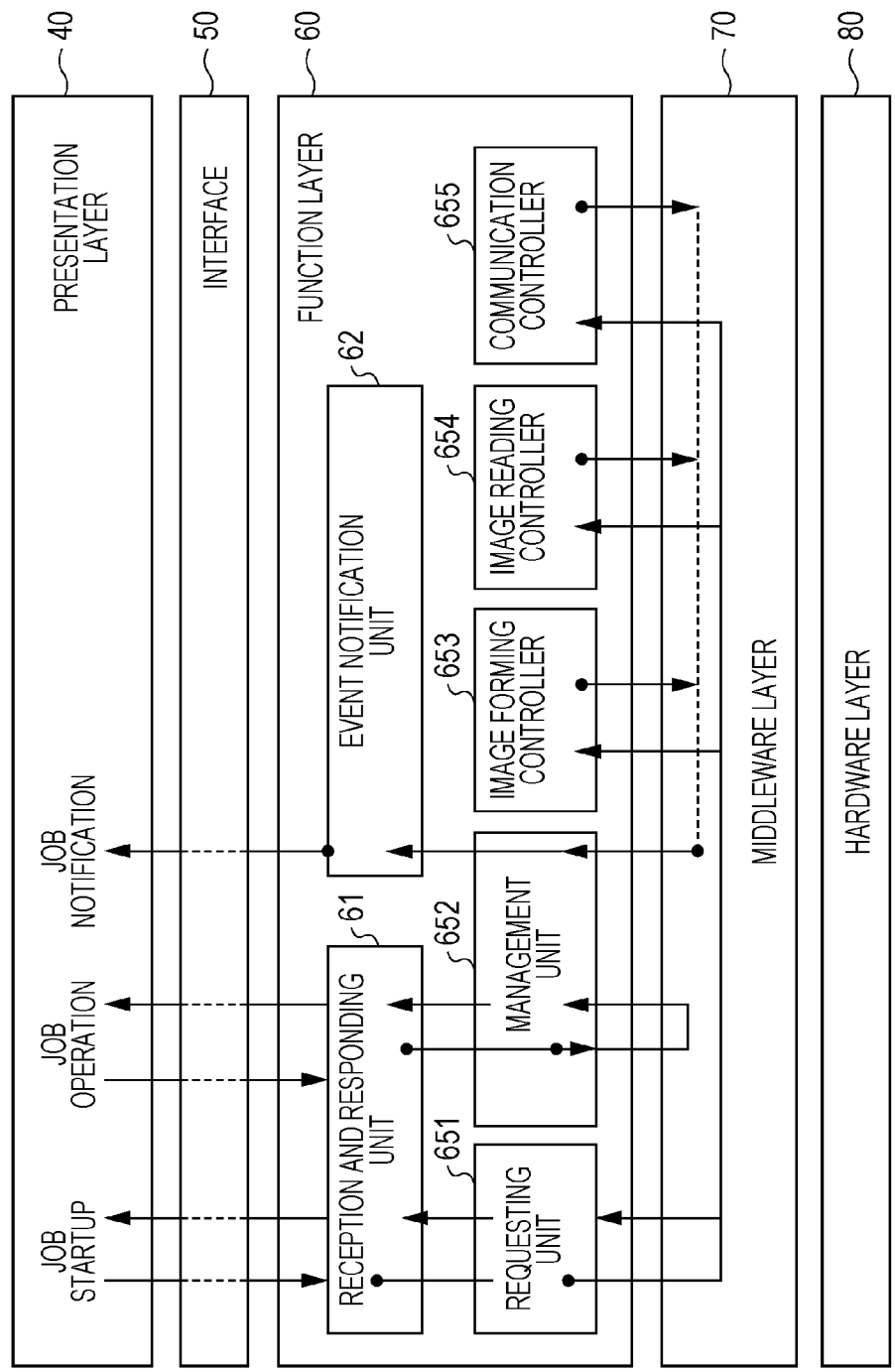
FIG. 12 illustrates an example of a layered structure representing the configuration of the information processing system.

FIG. 12 illustrates an example of the layered structure representing the configuration of the information processing system 1. The module group of FIG. 12 includes the requesting unit 651 and the management unit 652 and a controller (hereinafter referred to as a "use controller") that is used in each module of an image forming controller 653, an image reading controller 654, and a communication controller 655. For example, the image forming controller 653 and the image reading controller 654 become a use controller in order to implement the copy function, and the image forming controller 653 becomes a use controller in order to implement the print function. In the discussion that follows, a module to perform the print function is exemplified to describe the role of each module.

When the user operates to request an image to be printed, the presentation layer 40 transmits to the function layer 60 via the interface 50 request data requesting the job to be started. Upon receiving the request data, the reception and responding unit 61 analyzes the request data, and supplies the request data to the requesting unit 651 as a module responding to the contents of the request (in this case, the requesting unit 651 in the print function). The requesting unit 651 analyzes the supplied request data, and then requests the middleware layer 70 to generate the job. The middleware layer 70 performs a process to generate the requested job, and notifies the requesting unit 651 of the process results. The requesting unit 651 notifies the presentation layer 40 of the notified process results via the reception and responding unit 61 and the interface 50.

The presentation layer 40 displays the notified process results. The middleware layer 70 also supplies the generated job to the use controller (the image forming controller 653 in the print function). The use controller converts the supplied job into a user job that has a format to be presented to the user, and then supplies data representing the contents of the user job to the management unit 652 via the middleware layer 70. The management unit 652 generates the XML data representing the contents of the user job indicated by the supplied data. The contents of the user job correspond to the status information, and the XML data generated by the management unit 652 is status information data. The management unit 652 transmits the generated status information data to the presentation layer 40 via the event notification unit 62 and the interface 50. The push-based notification related to the job is thus performed.

The user may now perform an operation to request a process to suspend, quit, or continue the job or to modify the order of priority. The presentation layer 40 then transmits the request data requesting one of these processes to the function layer 60 via the interface 50. Upon receiving the request data, the reception and responding unit 61 analyzes the received request data, and supplies the request data to the management unit 652 as the module responsive to the contents of the request (the management unit 652 in the print function). The management unit 652 analyzes the supplied request data, and then requests the middleware layer 70 to perform the requested process. The middleware layer 70 performs the requested process, and notifies the management unit 652 of the process results. The management unit 652 notifies the presentation layer 40 of the notified process results via the reception and responding unit 61 and the interface 50. The presentation layer 40 then displays the notified process results.

The information processing system 1 thus configured performs an execution process to execute a process, such as image forming, in response to the operation of the user. The operation of each apparatus in the information processing system 1 is described with reference to FIG. 13 and FIG. 14.

Figure 13:
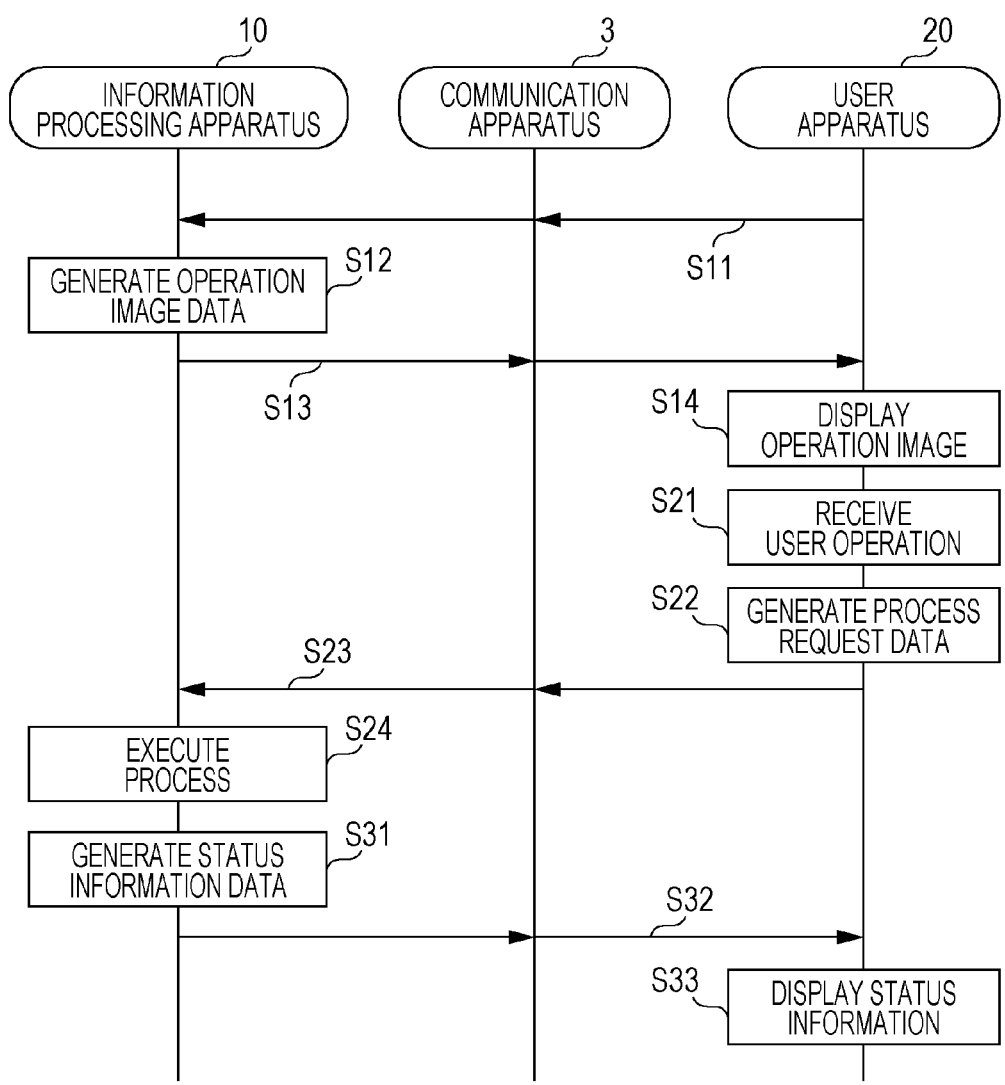
FIG. 13 is a sequence chart illustrating an example of an operation of each apparatus in an execution process.

FIG. 13 is a sequence chart illustrating an example of an operation of each apparatus in the execution process. In the example of FIG. 13, the user operates the user apparatus 20. The execution process is triggered when the user accesses the URL of the information processing apparatus 10 after starting up a browser on the user apparatus 20.

The user apparatus 20 transmits to the information processing apparatus 10 via the communication apparatus 3 the request data requesting the operation image (step S11). Upon receiving the request data, the information processing apparatus 10 generates the operation image data including the operation image requested by the request data (step S12). The information processing apparatus 10 transmits the operation image data to the user apparatus 20 via the communication apparatus 3 (step S13). The user apparatus 20 displays the operation image included in the received operation image data (step S14). The operations in steps S11 and S14 are performed by the display 301, and the operations in steps S12 and S13 are performed by the providing unit 102.

When the user performs an operation on the displayed operation image, the user apparatus 20 receives the operation of the user (step S21). If the user operation is received in the instruction content determination image (such as the operation image A11 of FIG. 6) in step S21, the user apparatus 20 generates the process request data indicating the request of the process specified by the operation on the operation image (step S22), and transmits the process request data to the information processing apparatus 10 via the communication apparatus 3 (step S23). Upon receiving the process request data, the information processing apparatus 10 executes the process responsive to the request indicated by the process request data (step S24). The operations in steps S21, S22, and S23 are performed by the requesting unit 302, and the operation in step S24 is performed by the processing unit 103 and the controller 105 in cooperation.

The information processing apparatus 10 generates the status information data each time the status of the process is updated (step S31), and transmits the generated status information data to the user apparatus 20 via the communication apparatus 3 (step S32). Upon receiving the status information data, the user apparatus 20 displays the status information indicated by the status information data (step S33). The operations in steps S31 and S32 are performed by the notification unit 104, and the operation in step S33 is performed by the display 301. Communications performed in steps S11, S13, S23, and S32 are performed via the interface unit 101 and the communication apparatus 3.

Figure 14:
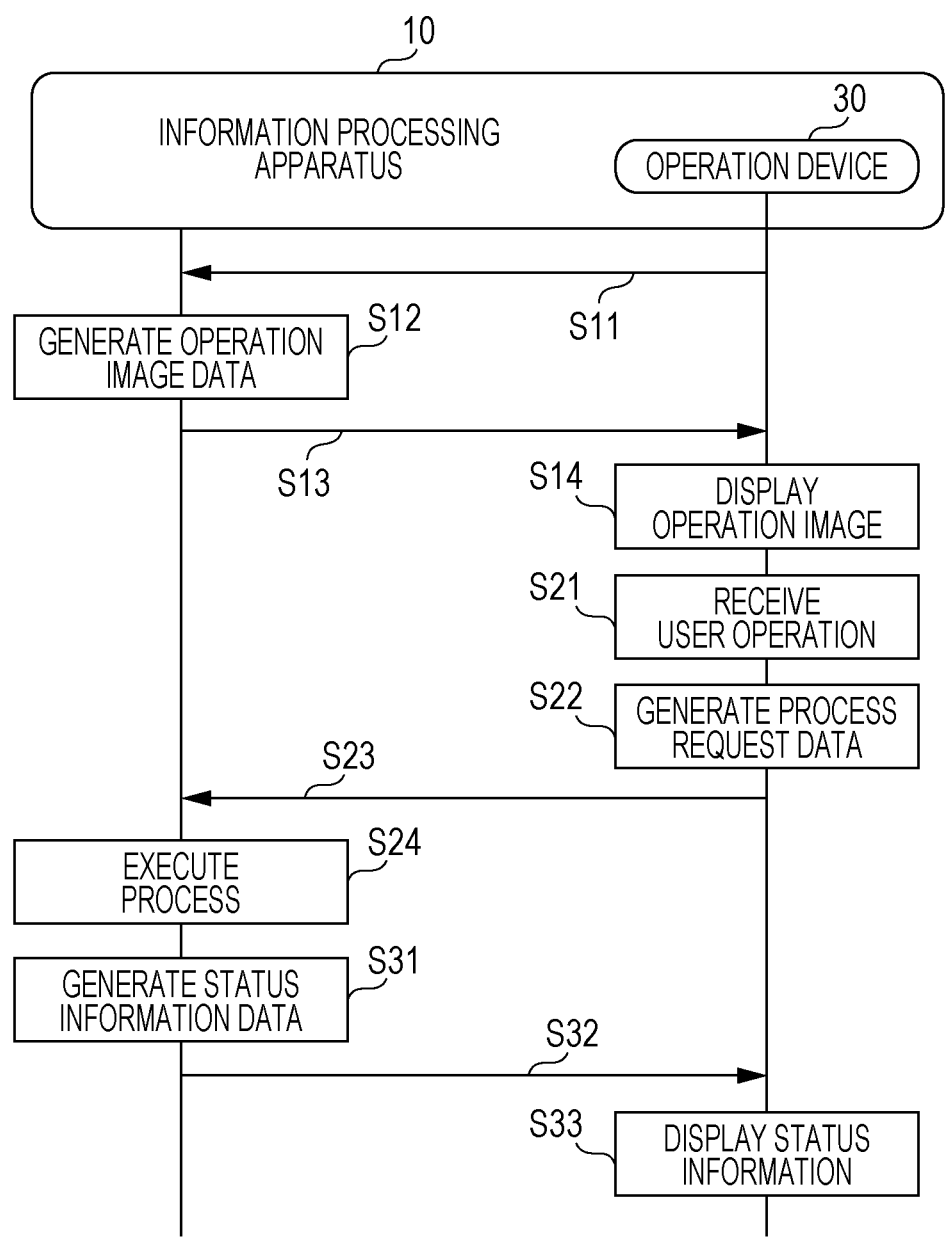
FIG. 14 is a sequence chart illustrating an example of another operation of each apparatus in the execution process.

FIG. 14 is a sequence chart illustrating an example of another operation of each apparatus in the execution process. Referring to FIG. 14, the user operates the operation device 30. In such a case, the operations in the steps performed by the user apparatus 20 as illustrated in FIG. 13 are performed by the operation device 30 in FIG. 14. Communications in steps S11, S13, S23, and S32 are preformed via the interface unit 101 skipping the communication apparatus 3.

Figure 16:
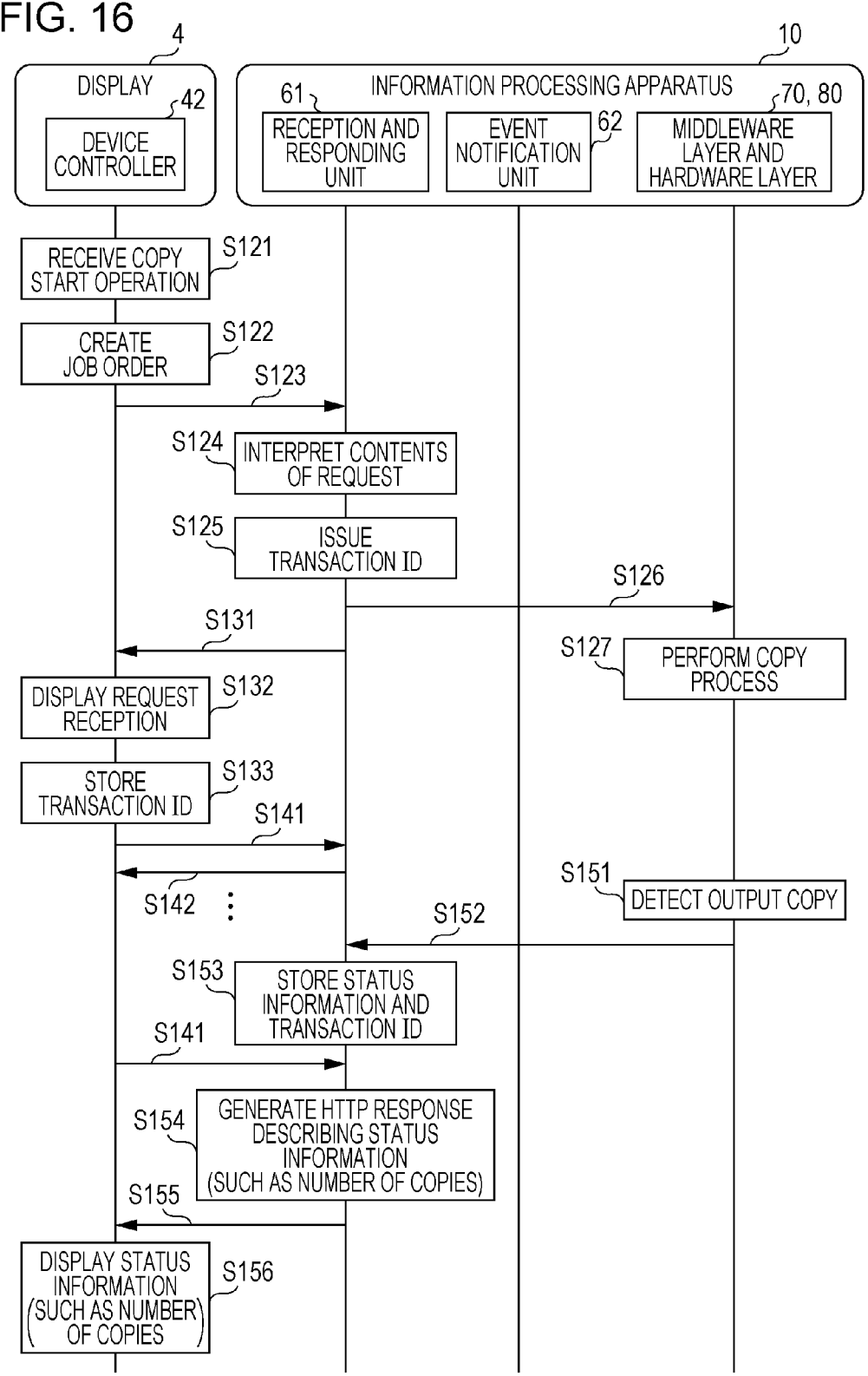
FIG. 16 is a sequence chart illustrating an example of the operation of each apparatus when a second notification method is used.
Figure 17:
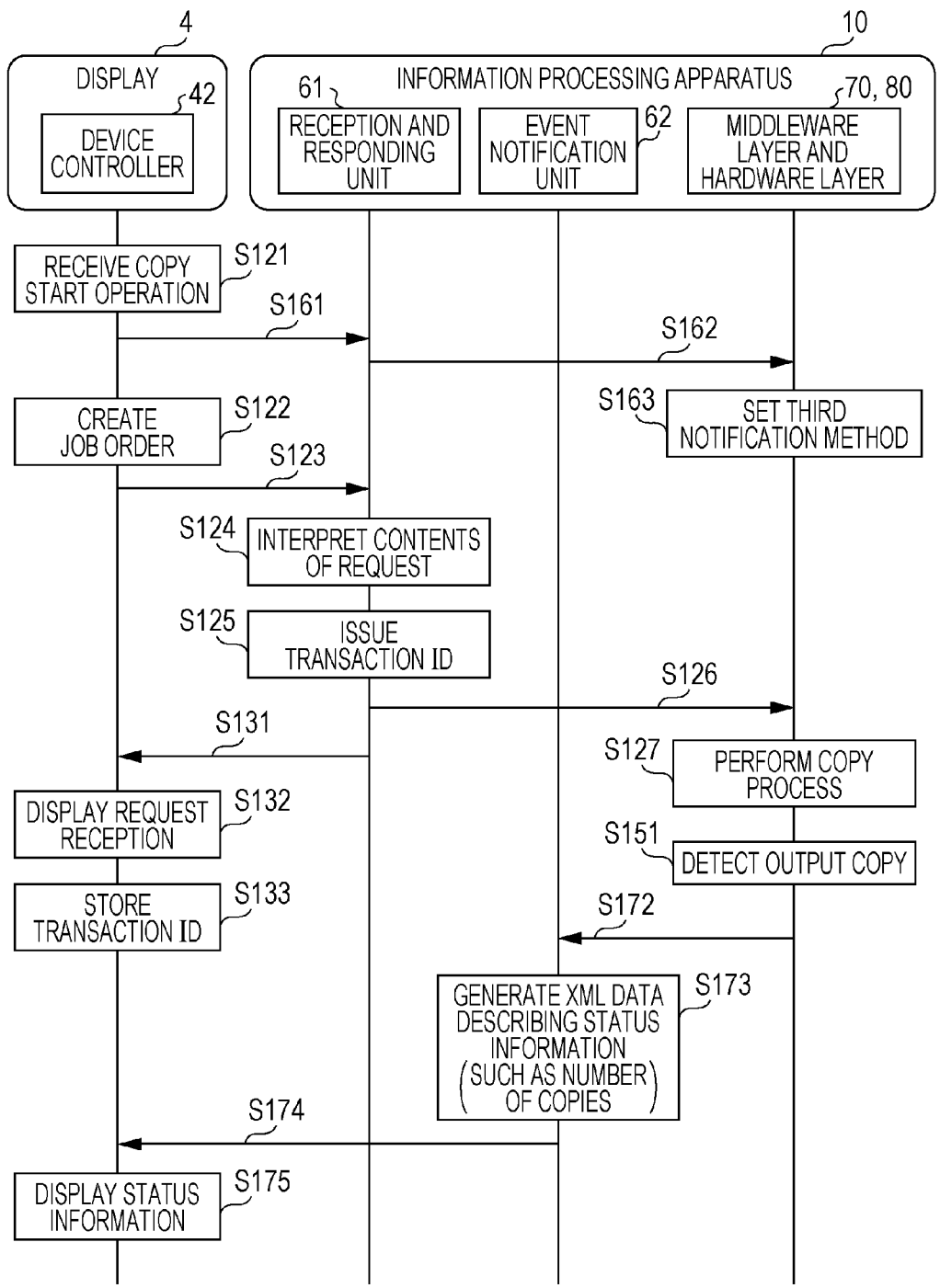
FIG. 17 is a sequence chart illustrating an example of the operation of each apparatus when a third notification method is used.
Figure 18:
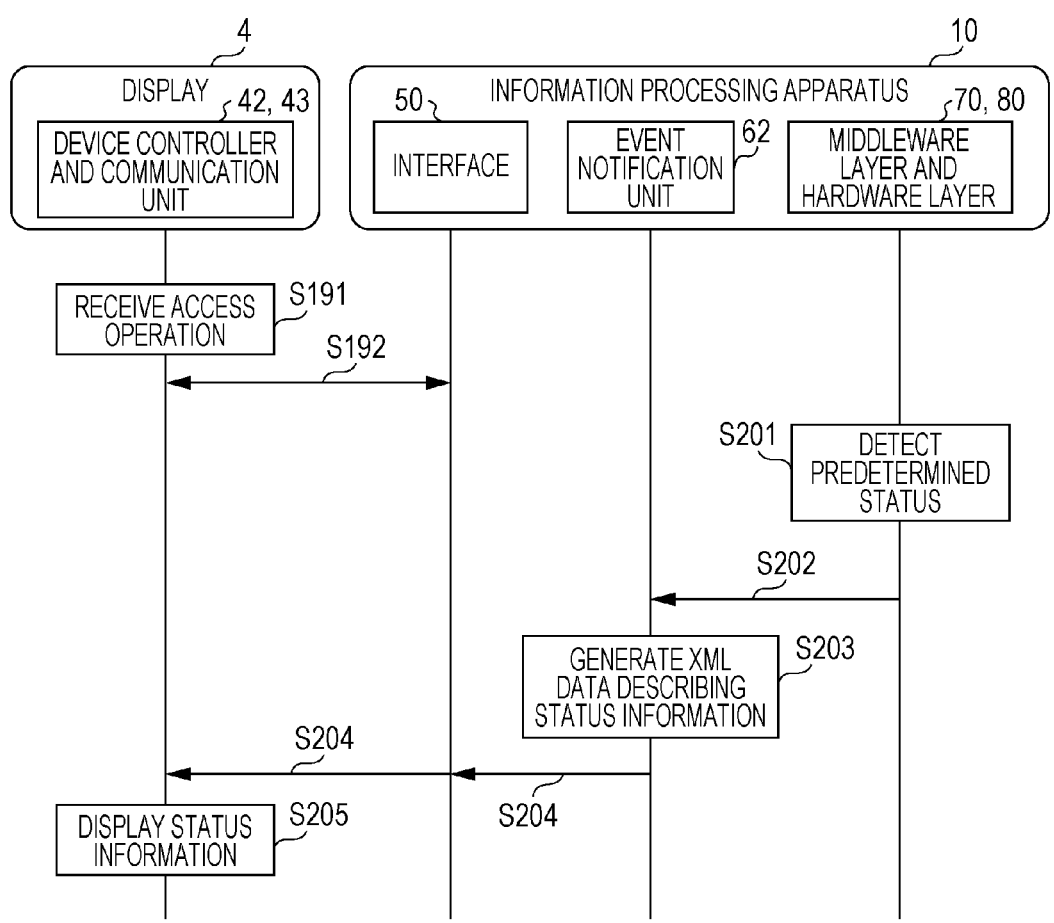
FIG. 18 is a sequence chart illustrating an example of the operation of each apparatus when a fourth notification method is used.

The notification unit 104 in the information processing apparatus 10 notifies the display device 4 of the status using one of the first through fourth notification methods. The operation of each apparatus in this process is described below with reference to FIG. 15 through FIG. 18. Entities active in the processes of FIG. 15 through FIG. 17 include the device controller 42 in the display device 4, the reception and responding unit 61 and the event notification unit 62 in the information processing apparatus 10, the middleware layer 70, and the hardware layer 80. In the process of FIG. 18, the same active entities as those in the processes of FIG. 15 through FIG. 17 are used except that the reception and responding unit 61 is replaced with the interface 50.

Figure 15:
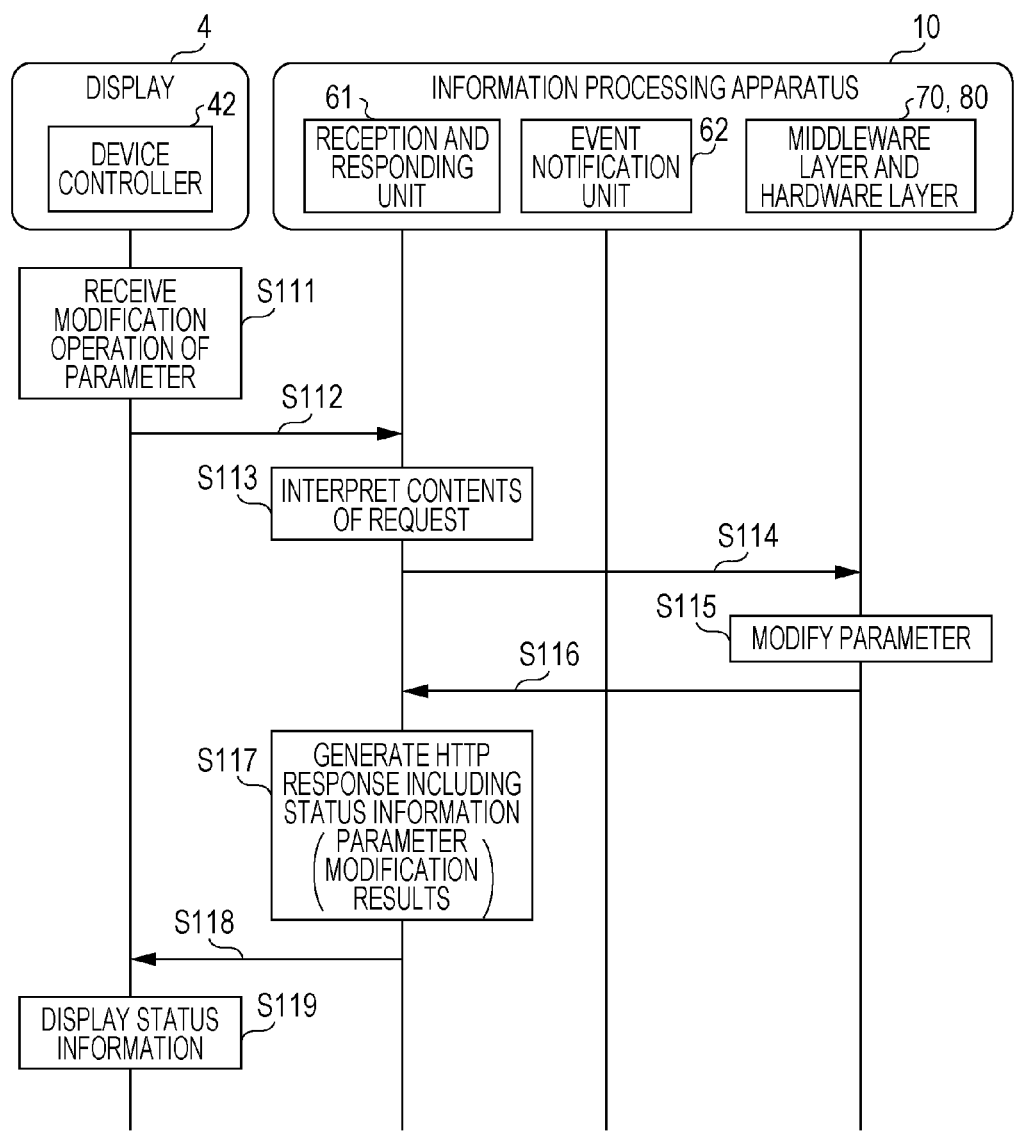
FIG. 15 is a sequence chart illustrating an example of the operation of each apparatus when a first notification method is used.

FIG. 15 is a sequence chart illustrating an example of an operation of each apparatus when the first notification method is used. The operation of FIG. 15 is triggered when an operation is made to modify a parameter for copying (such as magnification, size of a paper sheet, or color mode) before the user performs the copying. Upon receiving an operation to modify the parameter (step S111), the device controller 42 in the display device 4 transmits to the information processing apparatus 10 the XML data describing the request to modify the parameter (the process request data) (step S112). Step S111 corresponds to step S21 (receiving the user operation) in FIG. 13 and FIG. 14, and step S112 corresponds to steps S22 and S23 (generating and transmitting the process request data) in FIG. 13 and FIG. 14.

Upon receiving the XML data, the reception and responding unit 61 in the information processing apparatus 10 interprets the contents of the request described in the XML data (step S113), and instructs the middleware layer 70 of the information processing apparatus 10 to execute the process in accordance with the interpreted contents (step S114). The middleware layer 70 and the hardware layer 80 execute the instructed process in cooperation, namely, modify the parameter (step S115). Steps S113 through S115 correspond to step S24 (executing the process) in FIG. 13 and FIG. 14.

The middleware layer 70 and the hardware layer 80 supplies, as the status information, information representing the results of the process to the reception and responding unit 61 (step S116). The reception and responding unit 61 generates the XML data (the status information data) describing the supplied status information (the modification results of the parameter) (step S117), and then transmits the XML data to the display device 4 as the requester of the process (step S118). The device controller 42 in the display device 4 displays the status information described on the received XML data on the display unit thereof (step S119). Steps S116 and S117 correspond to step S31 (generating the status information data) in FIG. 13 and FIG. 14. Step S118 corresponds to step S32 (transmitting the status information data), and step S119 corresponds to step S33 (displaying the status information).

FIG. 16 is a sequence chart illustrating an example of an operation of each apparatus when the second notification method is used. The operation of FIG. 16 is triggered when the user makes an operation to cause the display device 4 to start copying with an original document set on the image reading unit 13 in the information processing apparatus 10. Upon receiving the operation to start copying (step S121), the device controller 42 in the display device 4 generates a job order responsive to the received operation (step S122). The device controller 42 transmits the process request data describing the received job order to the information processing apparatus 10 via the communication unit 43 of FIG. 10 (step S123). The reception and responding unit 61 in the information processing apparatus 10 receives the process request data via the interface 50 of FIG. 10, interprets the contents of the requested process in accordance with the described job order (step S124), and issues the transaction ID corresponding to the process (step S125).

The reception and responding unit 61 generates information indicating the instruction of the process based on the interpreted contents of the process (the information is called a copy job herein, and is hereinafter generally referred to as "instruction information") and supplies the instruction information together with the transaction ID to the middleware layer 70 (step S126). The middleware layer 70 and the hardware layer 80 execute the process (copy process) in cooperation based on the instruction information (step S127). After supplying the instruction information, the reception and responding unit 61 transmits XML data as an HTTP response to the display device 4 (step S131). The XML data includes information that indicates that the request to copy has been received (such as a character string "copy job has been accepted") and the issued transaction ID. The operation in step S131 may be performed in parallel with or prior to the operation in step S126. The device controller 42 in the display device 4 references the HTTP response, and displays on the display unit thereof information indicating that the request has been accepted (step S132), and causes the transaction ID to be stored on the memory thereof (step S133).

After receiving the response to the request of the copy process, the device controller 42 in the display device 4 transmits as an HTTP request the notification request requesting the status of the copy process to be notified and the XML data describing the transaction ID stored in step S133 (step S141). If the status information of the copy process associated with the transaction ID is not yet supplied, the reception and responding unit 61 in the information processing apparatus 10 transmits to the display device 4 the HTTP response that indicates that the status information has not been received (step S142). The operations in steps S141 and S142 are repeated.

When a copy (an image indicating the read original document) is output to a medium, the middleware layer 70 in the information processing apparatus 10 detects the copy (step S151). The middleware layer 70 associates the status information indicating that the copy has been output to the medium with the transaction ID supplied in step S126, and then supplies the status information with the transaction ID associated therewith to the reception and responding unit 61 (step S152). The reception and responding unit 61 causes the memory 12 to store the supplied status information and transaction ID (step S153). Upon receiving the HTTP request having the notification request and transaction ID described thereon after step S153 (step S141), the reception and responding unit 61 reads from the memory 12 the status information associated with the transaction ID described on the HTTP request, and generates an HTTP response having the status information described thereon (step S154).

When the reception and responding unit 61 transmits the HTTP response to the display device 4 (step S155), the device controller 42 in the display device 4 displays the status information described on the HTTP response as illustrated in step S132 on the display unit of the display device 4 (step S156). Since the information related to the process requested by the display device 4 is associated with the transaction ID, the status of the process is notified to the display device 4 as the requester. The operations in steps S151 through S156 are repeated until the process results are notified at the end of the copy process.

FIG. 17 is a sequence chart illustrating an example of an operation of each apparatus when the third notification method is used. The operation of FIG. 17 is triggered when the user performs an operation to start copying as illustrated in FIG. 16. When the device controller 42 in the display device 4 receives the operation to start copying (step S121), the event notification unit 62 performs a push-based notification, namely, transmits to the information processing apparatus 10 the XML data describing a designation that the third notification has been specified (step S161). Upon receiving the XML data, the reception and responding unit 61 in the information processing apparatus 10 transfers to the middleware layer 70 the designation that the third notification method has been specified (step S162).

The middleware layer 70 receives the transferred designation, and sets the display device 4 to perform the notification in the third notification method (step S163). The middleware layer 70 turns on a flag indicating whether to perform the third notification method. In the example of FIG. 17, the notification method is specified by the XML data different from the process request data. Alternatively, the device controller 42 in the display device 4 may describe a specified notification method on the process request data. In such a case, when the reception and responding unit 61 supplies to the middleware layer 70 the instruction information and transaction ID in step S126, the reception and responding unit 61 sets the third notification method by notifying the middleware layer 70 that the third notification method has been specified.

The operations in steps S122 through S127 and the operations in steps S131 through S133 as illustrated in FIG. 16 are then performed. The middleware layer 70 and the hardware layer 80 of the information processing apparatus 10 performs the operation in step S151 (detecting the output copy). Since the flag is turned on, the middleware layer 70 and the hardware layer 80 supply the status information indicating that the copy has been output to the medium and the transaction ID to the event notification unit 62 rather than to the reception and responding unit 61 (step S172). The event notification unit 62 generates the XML data describing the supplied status information (such as the number of copies) and the transaction ID (step S173), and then transmits the XML data to the display device 4 (step S174). The device controller 42 in the display device 4 displays the contents of the XML data (such as the status information C1 of FIG. 7A) on the display unit of the display device 4 (step S175). The operations in steps S151, and S172 through S175 are repeated until the process results are notified at the end of the copy process.

FIG. 18 is a sequence chart illustrating an example of an operation of each apparatus when the fourth notification method is used. The operation of FIG. 18 is triggered when an access operation is performed on the information processing apparatus 10 (such as inputting a URL or selecting a bookmark) with the browser turned on in the display device 4. The device controller 42 receives the access operation (step S191), and establishes a connection with the interface 50 in the information processing apparatus 10 in accordance with the WebSocket standard in cooperation with the communication unit 43 (step S192).

If a predetermined status (such as an out-of-toner or out-of-paper sheet status) occurs later on the information processing apparatus 10, the middleware layer 70 and the hardware layer 80 of the information processing apparatus 10 cooperate to detect the predetermined status (step S201). The middleware layer 70 and the hardware layer 80 supply the status information indicating the detected status to the event notification unit 62 (step S202). The event notification unit 62 generates the XML data including the supplied status information described thereon (step S203), and transmits the XML data to the WebSocket-connected display device 4 via the interface 50 (step S204). The device controller 42 in the display device 4 displays the status information described on the XML data received in step S204 on the display unit of the display device 4 (step S205).

As described above, statuses different from one display device 4 to another display device 4 may be notified. In such a case, subsequent to step S192, the device controller 42 transmits to the information processing apparatus 10 via the communication unit 43 the XML data describing the status to be notified to the display device 4. Upon receiving the XML data via the interface 50, the event notification unit 62 stores the status to be notified in association with the destination of the display device 4. If the status information supplied in step S202 represents the stored status to be notified, the event notification unit 62 notifies that status.

Figure 19:
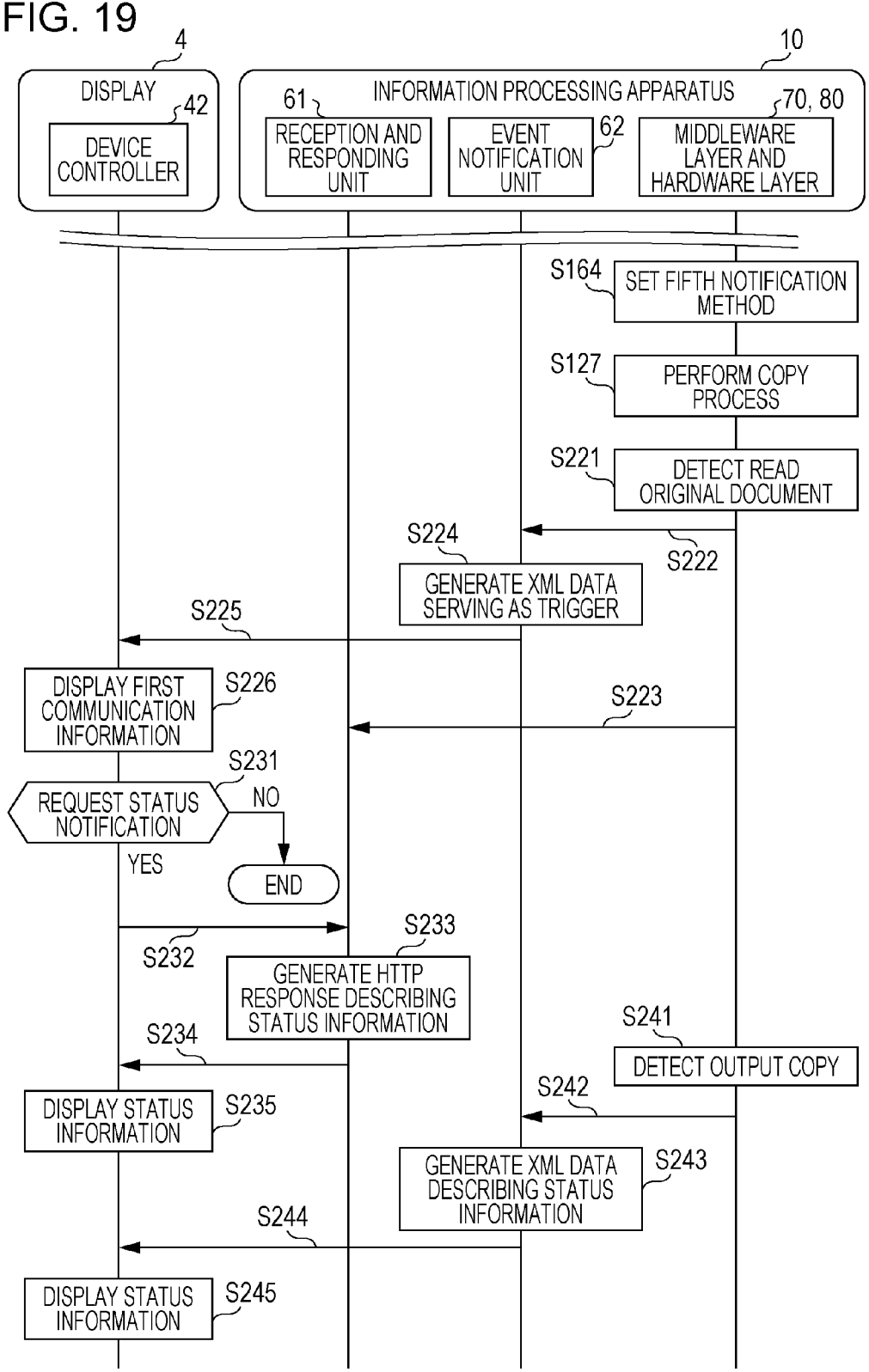
FIG. 19 is a sequence chart illustrating an example of the operation of each apparatus when a fifth notification method is used.

FIG. 19 is a sequence chart illustrating an example of an operation of each apparatus when the fifth notification method is used. In the example of FIG. 19, operations in steps S121 (receiving the operation) through S127 (executing the copy process) of FIG. 17 are performed. The operations in step S161 and S162 related to specifying the notification method are also performed. Unlike the example of FIG. 17, the fifth notification method is specified. For this reason, the middleware layer 70 of the information processing apparatus 10 performs the settings to notify in the fifth notification method (step S164). Note that steps down to step S126 and down to step S162 are not illustrated in FIG. 19. The operations in step S127 and S164 are performed by the processing unit 103.

The middleware layer 70 and the hardware layer 80 of the information processing apparatus 10 detect the reading of an original document (step S221). Since the first notification is determined to be performed in this case, the middleware layer 70 and the hardware layer 80 supply the status information including a thumbnail image of the read original document to both the event notification unit 62 and the reception and responding unit 61 (steps S222 and S223). The operations in steps S221 through S223 are performed by the processing unit 103.

The event notification unit 62 generates the XML data describing the occurrence of the status of the process (namely, the XML data that triggers the notification of the status of the process) (step S224), and then transmits the XML data to the display device 4 (step S225). The transmission of the XML data in step S225 is the first communication. The operations in steps S224 and S225 are performed by the notification unit 104. In the first communication, the device controller 42 in the display device 4 displays the information notified in the first communication in the exemplary embodiment (step S226).

Figure 20:
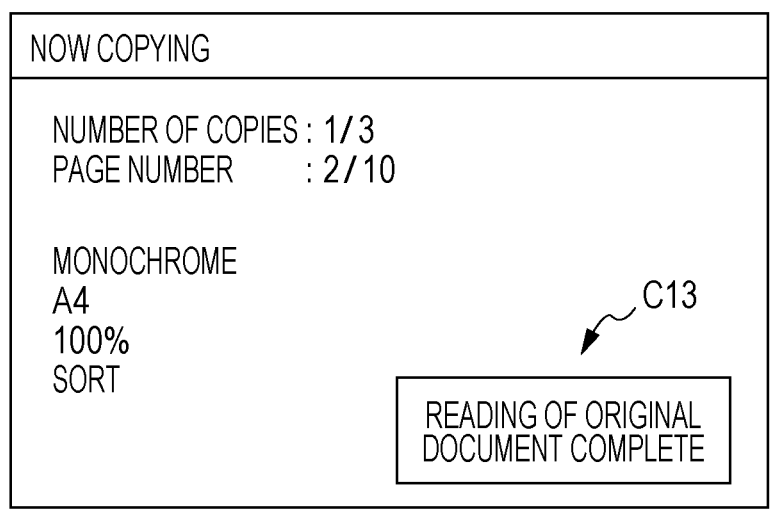
FIG. 20 illustrates an example of information notified through first communication.

FIG. 20 illustrates an example of information notified through the first communication. As illustrated in FIG. 20, an image C13 including a character string reading "reading of original document complete" is displayed. In the example of FIG. 19, the first communication in step S225 notifies the display device 4 that the status indicating the completed reading of the original document has occurred, and the image C13 represents the contents of this notification. Subsequent to step S226 of FIG. 19, the device controller 42 determines whether the request to notify the status of the process (namely, the notification request) is to be performed or not (step S231).

If the predetermined operation is performed as described above in the exemplary embodiment, the device controller 42 performs the notification request. More specifically, the device controller 42 determines that the notification request is to be made (yes in step S231) if the user performs an operation (tapping operation) to select the image C13 of FIG. 20. Upon determining that the notification request is to be made, the device controller 42 transmits the HTTP request describing the notification request to the information processing apparatus 10 (step S232). The operations in steps S231 and S232 are performed by the requesting unit 402.

Figure 21:
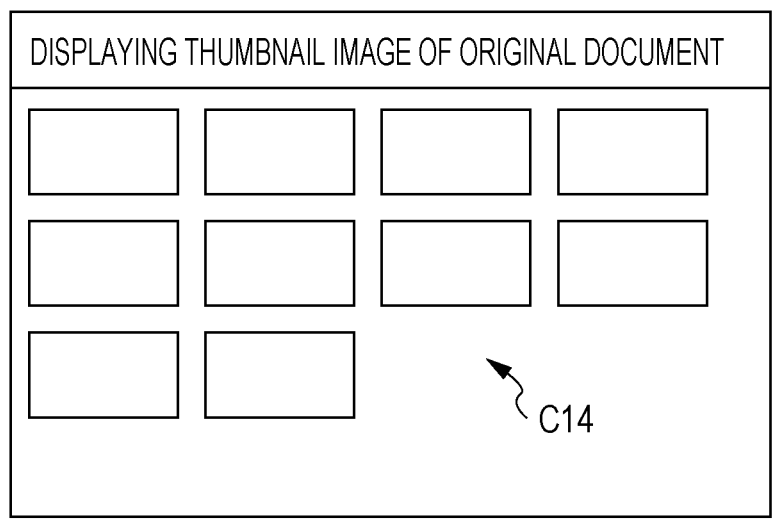
FIG. 21 illustrates an example of a status notified through second communication.

Operations in steps S233 (generating the HTTP response), S234 (transmitting the HTTP response), and S235 (displaying the status information), respectively similar to the operations in steps S154, S155, and S156 of FIG. 16 are performed. The status of the process is thus notified. In step S233, the reception and responding unit 61 generates the HTTP response describing the status information including the thumbnail image supplied in step S233. The transmission of the HTTP response in step S234 is the second communication. The operations in steps S233 and S234 are performed by the notification unit 104, and the operation in step S235 is performed by the display 401. FIG. 21 illustrates the status thus notified.

FIG. 21 illustrates an example of the status notified through the second communication. A character string reading "displaying thumbnail image of original document" and a list of thumbnail images C14 are displayed as illustrated in FIG. 21. Upon determining in step S231 that the notification of the status is not to be requested (no in step S231), the device controller 42 ends the operation responsive to the first communication. If an operation to select the image C13 of FIG. 20 is not performed until the end of the copy process, the device controller 42 determines that the notification of the status is not to be requested.

The middleware layer 70 and the hardware layer 80 detect the image of the read original document, namely, the outputting of the copy to the medium (step S241). Since the second notification is to be performed in this case, the middleware layer 70 and the hardware layer 80 supply the status information including the number of copies to the event notification unit 62 rather than the reception and responding unit 61 (step S242). The operations in steps S241 and S242 are performed by the processing unit 103. The event notification unit 62 generates the XML data describing the status of the process (namely, the status information data) (step S243), and then transmits the XML data to the display device 4 (step S244). The transmission of the XML data in step S244 is the third communication. The device controller 42 in the display device 4 displays the status information described on the received XML data on the display unit of the display device 4 (step S245). The operations in steps S243 and S244 are performed by the notification unit 104, and the operation in step S245 is performed by the display 401.

If the notification is performed using the response to the polling as in the second notification method, the polling is not necessarily performed at the moment of the occurrence of the status of the process. It takes time from the occurrence of the status to the notification. In contrast, if the first notification is performed in the fifth notification method, the notification is made by performing the first communication and second communication at the occurrence of the status of the process. A period of time from the occurrence of the status to the notification is short in comparison with the case when the notification is performed by the response to the request from the display device 4. In other words, the occurring status is notified faster.

If the occurring status of the process is notified in the push-based notification as in the third notification method, the information processing apparatus 10 selects the status as a target of notification. In contrast, the first notification may be performed in the fifth notification method. As long as the HTTP request is not transmitted from the display device 4 as the notification destination, the status of the process is not notified even if the first communication is performed. In the exemplary embodiment, the notification destination is enabled to select whether to cause the status to be notified or not if the status occurs as a target of notification.

The exemplary embodiment has been described for exemplary purposes, and may be modified as described below. The exemplary embodiment and the modifications thereof may be combined as appropriate.

In the discussion of the exemplary embodiment, the user apparatus 20 includes the communication unit that performs communications complying with the wireless LAN standards. The exemplary embodiment is not limited to this configuration. For example, the user apparatus 20 may include a communication unit complying with the wired LAN standards, such as the communication unit 33 in the operation device 30. In such a case, the user apparatus 20 is connected to a wired LAN router or hub via a communication cable. The communication unit in the user apparatus 20 works to communicate with the other communication apparatus (a communication apparatus, such as a router or hub, which is different from the information processing apparatus 10).

In the discussion of the exemplary embodiment, the first communication unit 15 in the information processing apparatus 10 and the communication unit 33 in the operation device 30 perform communications complying with the wired LAN standards. The exemplary embodiment is not limited to this configuration. For example, communications complying with universal serial bus (USB) or high-definition multimedia interface (HDMI) (registered trademark) may be performed. Furthermore, wireless communications complying with the wireless LAN standards, Bluetooth (registered trademark), or near field communication (NFC) may be performed. In each case, the communication unit 33 in the operation device 30 communicates with the first communication unit 15 in the information processing apparatus 10 skipping another communication apparatus, such as a router or hub.

In the exemplary embodiment, the operation device 30 includes the controller 31 and the memory 32 as illustrated in FIG. 2. However, the operation device 30 may not necessarily have to include the controller 31 and the memory 32.

Figure 22:
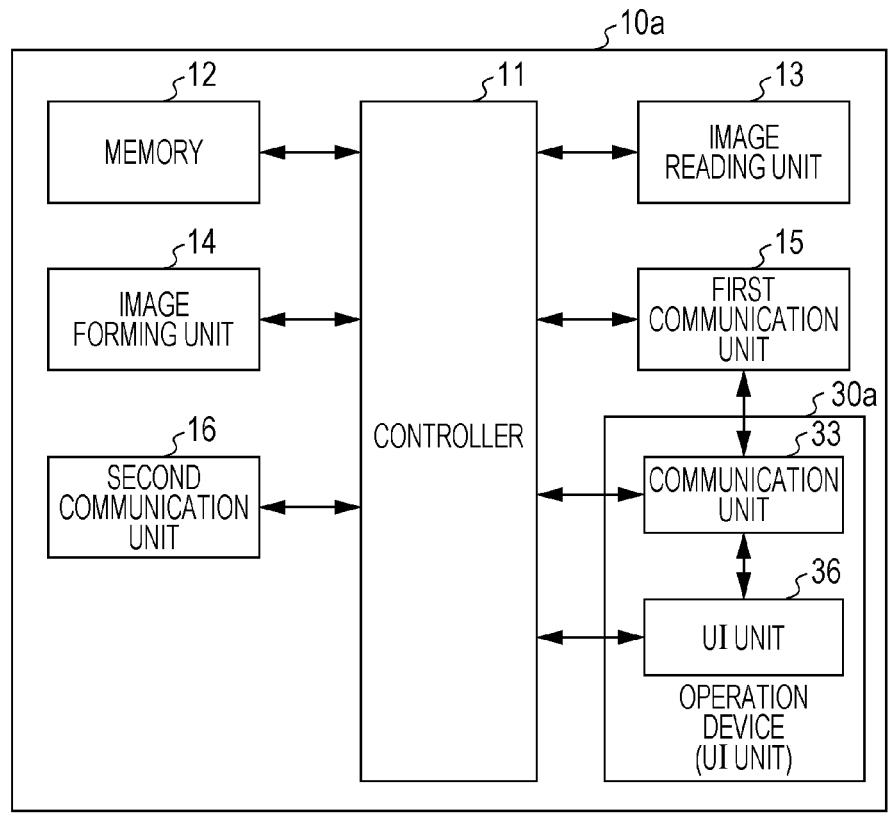
FIG. 22 illustrates an example of the hardware configuration of an information processing apparatus of a modification.

FIG. 22 illustrates an example of the hardware configuration of an information processing apparatus 10a of a modification of the exemplary embodiment. FIG. 22 illustrates the information processing apparatus 10a, including elements similar to those illustrated in FIG. 4 other than the display unit, and an operation device 30a. In this modification, the operation device 30a is mounted on the housing of the information processing apparatus 10a. The operation device 30a includes the communication unit 33 of FIG. 3 and a user interface (UI) unit 36.

The communication unit 33 and the UI unit 36 are connected to a bus in the information processing apparatus 10a, and is controlled by the controller 11. The communication unit 33 is also connected to the first communication unit 15. The UI unit 36 includes a display screen and a touch sensor overlaid on the display screen, and displays an image in response to an operation of the user. The UI unit 36 supplies to the controller 11 operation data responsive to the received user operation, and the controller 11 performs a process responsive to the operation data.

In this modification, the controller 11 executes the program of a browser, thereby implementing the function of the operation unit 300 of FIG. 5. The display 301 receives the operation image data from the first communication unit 15 via the communication unit 33, and displays the operation image data on the UI unit 36. The requesting unit 302 receives an operation on the operation image when the UI unit 36 is tapped by the user. Via the communication unit 33 and the first communication unit 15, the requesting unit 302 transmits instruction data indicating an instruction determined by the received operation. In this modification, the communication is performed between the information processing apparatus 10a and the display device 4 via the interface unit regardless of whether the communication is performed via the other communication apparatus or not.

In the exemplary embodiment and the modifications, the operation device 30 is mounted to the housing of the information processing apparatus. But the operation device 30 may not necessarily have to be mounted to the housing of the information processing apparatus.

Figure 23:
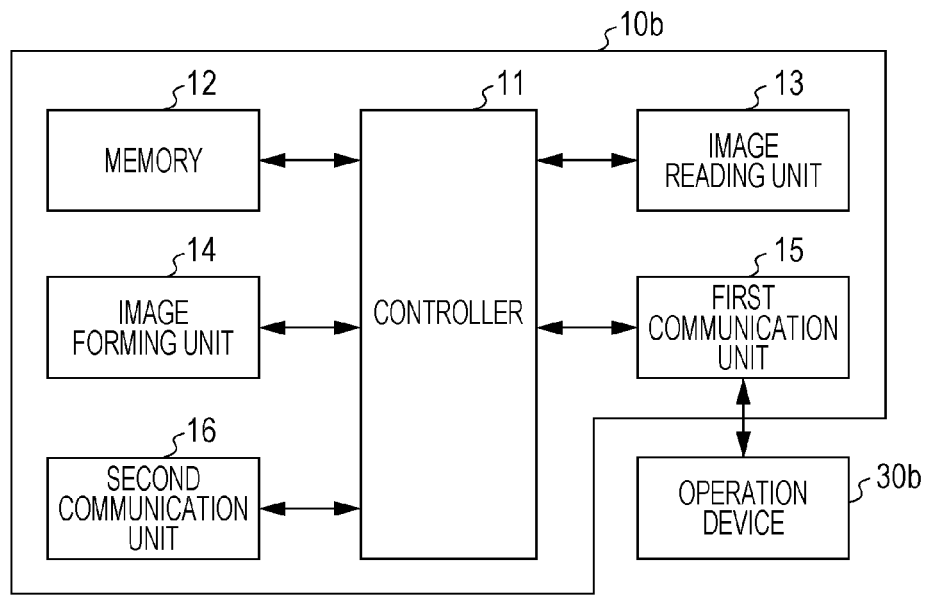
FIG. 23 illustrates an example of the hardware configuration of the information processing apparatus of the modification.

FIG. 23 illustrates an example of the hardware configuration of an information processing apparatus 10b of a modification. FIG. 23 illustrates the information processing apparatus 10b, including elements similar to those illustrated in FIG. 4 other than the display unit, and an operation device 30b. The operation device 30b includes the elements illustrated in FIG. 3, and works as the operation unit 200 of FIG. 5.

The operation device 30b is connected to the first communication unit 15 via a communication cable. The operation device 30b is used by the user in a state in which the operation device 30b is mounted on the housing of the information processing apparatus 10b or placed on a desk near the information processing apparatus 10b. As the operation device 30 of the exemplary embodiment, the operation device 30b communicates with the information processing apparatus 10b skipping the other communication apparatus (such as the communication apparatus 3 in FIG. 1). The communication cable may be unplugged from the operation device 30b and the operation device 30b may be carried to another location to be used for different applications. In the example of FIG. 23, another apparatus working as an operation unit (such as the user apparatus 20 of FIG. 1) instead of the operation device 30b may be connected to the information processing apparatus 10b. The operation device 30b may be connected to the communication apparatus 3 to communicate with the information processing apparatus 10b via the communication apparatus 3 and the communication network 2.

The processes to be performed by the processing unit 103 are not limited to those described with reference to the exemplary embodiment, and may include any process. For example, if the information processing apparatus includes a machine in a plant and a device that controls the machine, the machine may transport or process materials. In this case, one of the user apparatus 20 and the operation device 30 makes communications with the information processing apparatus 10 via a common interface unit, thereby operating the information processing apparatus 10.

In the exemplary embodiment, the requesting unit 402 receives an operation on the touch sensor. The configuration is not limited to the touch sensor. If the user apparatus is a tablet terminal, the operation may be received using a button disposed on the housing of the user apparatus. If the user apparatus is a personal computer, the operation may be received using a keyboard or mouse.

The interface unit 101 complies with the SOAP standard. Alternatively, the interface unit 101 may interface for communications complying with standards for representational state transfer (REST) or standard generalized markup language (SGML). The interface unit 101 may be any type as long as the interface unit 101 interfaces for communications complying with any standard for use in web. In this way, most of apparatuses enabled to use a browser may be used as an operation device.

In the exemplary embodiment, the notification unit 104 determines in accordance with the type of the occurring status whether to perform the first notification or the second notification. The notification unit 104 is not limited to this method. The notification unit 104 may determine whether to perform the first notification or the second notification, depending of the size of information representing the status of the process as a target of notification (namely, the status information). The size of information represents the magnitude of information handled by the computer, and is expressed in bits, bytes, words, or octets. If the size of the status information supplied from the processing unit 103 is equal to or above a threshold value, the notification unit 104 may determine to perform the first notification. If the size of the status information supplied from the processing unit 103 is below the threshold value, the notification unit 104 may determine to perform the second notification.

If the status occurs as a target of notification, the information processing system 1 allows the notification destination to select whether to cause the status to be notified or not. Depending on the status, the notification is not performed. The workload on the communication and the workload on the process of the display device 4 are reduced. As the size of the status information which represents the status and by which a determination as to whether to notify or not is determined is larger, the advantage of reducing the workloads is more pronounced. Since the determination is made based on the size of the status information, the workloads on the communication and process are reduced.

The notification unit 104 may perform the determination in accordance with the degree of change in the status of the process as the target of notification. For example, the degree of change in the status may be represented by the number of times by which the status changes during a predetermined period of time (such as during 1 minute). In the case of the copy process, for example, the number of copies may change by tens of times during 1 minute, and the parameters on copying, such as the sheet size or image quality may not change at all during 1 minute, or may change several times at most during 1 minute. If the number of times indicating the degree of change is equal to or above a threshold value, the notification unit 104 determines to perform the first notification. If the number of times indicating the degree of change is below the threshold value, the notification unit 104 determines to perform the second notification.

The status, such as the number of copies, which changes frequently, becomes less valuable as the period of time from the occurrence of the status to the notification becomes longer. For example, although the copy process is complete, the number of copies in the middle of the copy process may be displayed. In such a case, the user may fail to notice that the copy has been completed. The value of the notified number of copies is lower than the precise number of copies that is notified. On the other hand, the parameters on copying, such as the sheet size or image quality may not change so frequently. Even if the period of time from the occurrence of the status to the notification becomes longer, the value of the status to be notified does not become so lower. Since the determination is performed depending on the degree of change in the status of the process in the modification, a decrease in the value of the status to be notified is controlled.

If the size of the status information or the degree of change in the status corresponds to the type of status, the determination may be performed in response to the type of occurring status in the exemplary embodiment. The workloads on the communication and process are reduced, and a decrease in the value of the status is thus controlled. Whether to perform the first notification or the second notification is determined in the ways described above, the usefulness of the notification is increased more than when the determination is not performed at all in the ways described above.

The notification unit 104 may switch between the first notification and the second notification depending on information obtained from the display device 4. If a predetermined operation is performed on the display device 4 after one of the first notification and second notification is performed, the notification unit 104 may perform the other of the first notification and second notification thereafter. The predetermined operation may be an operation to transmit the HTTP request subsequent to the first communication in the first notification (for example, the operation for the notification request, such as the operation to select the image C13 of FIG. 20). Once the first notification is performed subsequent to the operation for the notification request, the second notification is performed thereafter.

If the second notification is performed, the predetermined operations may include an operation to close the displayed status information, an operation to minimize the browser, or an operation to switch from a screen displaying the status of the process (the screen of FIG. 7) to the screen displaying the operation image (the screen of FIG. 6). The display 401 in the display device 4 displays an operation image to switch between the fist notification and the second notification, and an operation to select on the switching operation image may be used. If one of these operations is performed, the requesting unit in the display device 4 transmits the HTTP request indicating that the predetermined operation has been performed. The notification unit 104 determines from the HTTP request that the predetermined operation has been performed, and then switches from the second notification to the first notification and then stays in the second notification. One of these operations may be used to switch from the first notification to the second notification.

If it is time consuming for the user to perform an operation to transmit the HTTP request with the first notification performed, the second notification may be performed through the switching operation described above. The time consuming operation is thus skipped. If the second communication is performed when a status as a target notification at a low usefulness level is included, that status is also notified. This leads to an increase in the workloads on the communication and process. The opportunity to select not to notify the status at the low usefulness level is provided by performing the first notification after the switching operation. In the modification, the time saving for the user is thus achieved with the workload of notification reduced.

The providing unit 102 may provide an image associated with the status of the process (hereinafter referred to as a "status image") to the display device 4.

Figure 24A:
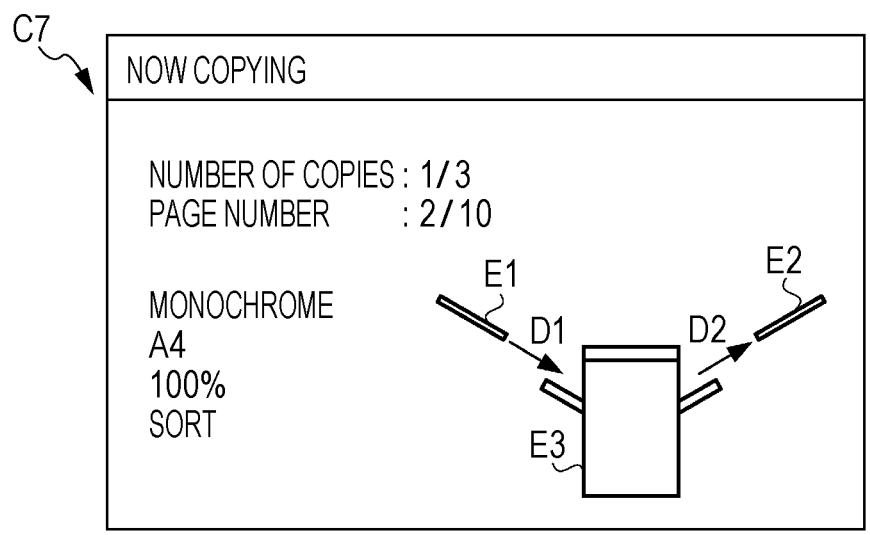
FIG. 24A and FIG. 24B illustrate examples of a status image.
Figure 24B:
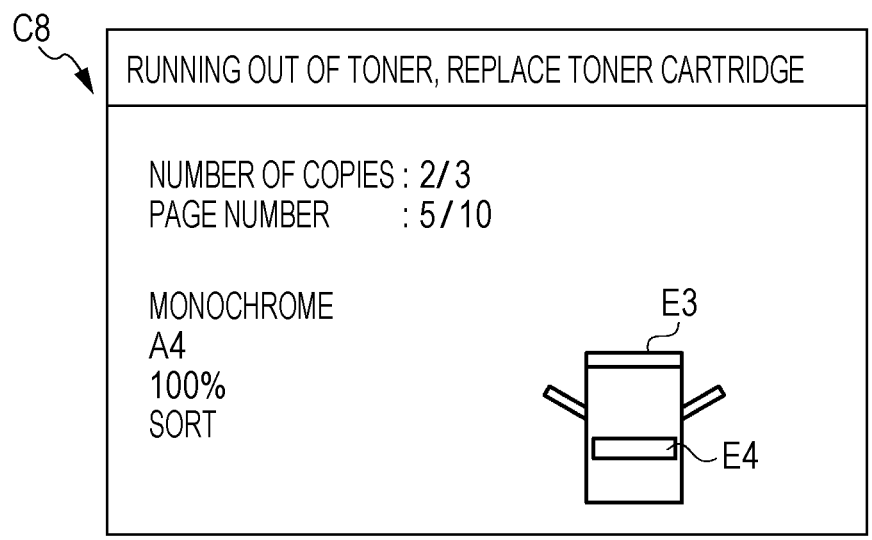

FIG. 24A and FIG. 24B illustrate examples of the status image. FIG. 24A illustrates status images E1, E2, and E3 together with status information C7 representing the status of the copy process. The status image E3 is the external view of the information processing apparatus 10. The status image E1 is an animation representing how a paper sheet enters the information processing apparatus 10, and repeatedly illustrates the transportation of the paper sheet in an arrow D1. The status image E2 is an animation representing how a paper sheet is discharged from the information processing apparatus 10, and repeatedly illustrates the transportation of the paper sheet in an arrow D2.

The status image E1 is associated with the status in which the original document is being read in the copy process or the scan process. The status image E2 is associated with the status in which the medium having an image formed in the copy process or the print process is being discharged. If the notification unit 104 notifies the display device 4 of the status in which the original document is being read as a status associated with the status image, the display 401 in the display device 4 displays the status image E1 as the status image associated with the notified status from among the statuses provided by the providing unit 102. If the notification unit 104 notifies the display device 4 of the status in which the medium having the image formed thereon is being output, the display 401 in the display device 4 displays the status image E2 associated with the notified status.

FIG. 24B illustrates status images E3 and E4 together with status information C8 representing an out-of-paper status. The status image E4 represents a section of the information processing apparatus 10 that stores paper sheets, and is associated with the out-of-paper status. If the notification unit 104 notifies the out-of-paper status, the display 401 displays the status images E3 and E4. With the status images E1, E2, and E4 displayed as illustrated in FIG. 24A and FIG. 24B, the user easily recognizes the statuses associated therewith in comparison with the case in which no status images are displayed.

Since each status image is supplied to the providing unit 102 in advance, the status image is not included in the data that the notification unit 104 transmits in the notification of the status (the XML data complying with the standards of the HTTP response and the WebSocket). In the modification, the notified status is more easily conveyed to the user and the workload on the communication of the notification is reduced.

In the exemplary embodiment, the requesting unit 402 issues the notification request when a predetermined operation is performed. The modification is not limited to this method. For example, if the predetermined operation has not been performed for a predetermined period of time (such as 1 minute) from the first communication, the requesting unit 402 may make the notification request. If the predetermined operation has been performed for a predetermined period of time (such as 1 minute) from the first communication, the requesting unit 402 may not make the notification request.

The requesting unit 402 may determine whether to make the notification request, depending on the type of the occurring status. In such a case, the notification unit 104 transmits the XML data describing the type of the occurring status in the first communication. The memory of the display device 4 stores a list of types of statuses making the notification request. If the type of the status described on the received XML data is included in the list, the requesting unit 402 transmits the HTTP request requesting the status to be notified. If the type of the status described on the received XML data is not included in the list, the requesting unit 402 does not transmit the HTTP request.

In addition to accounting for the type of the occurring status, the requesting unit 402 may determine whether to make the notification request, depending on the size of the information representing the occurring status or the degree of change of the status. In this case, as well, the notification unit 104 notifies these pieces of information in the first communication. The requesting unit 402 determines whether to transmit the HTTP request requesting the status to be notified, depending on these pieces of information notified in the first communication.

As described above, the notification unit 104 determines the first or second notification using the information notified in the first communication. The effect of decreasing the workload on the communication and process is enhanced, and the reduction in the value of the notified status is controlled. The modification increases the usefulness of notification in comparison with the case in which the determination method as to whether to transmit the HTTP request, available from the exemplary embodiment and the modifications, is not performed.

The present invention may include the information processing apparatus, the display device, the communication apparatus, and the information processing system including these apparatus. The present invention may also include a non-transitory computer readable medium storing a program that causes a computer to function as the above-described elements. The program may be provided in a stored state on an optical disk, or downloaded onto the computer via a communication network, such as the Internet, and then installed for use in the computer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to act as:
a processing unit that performs a process on the information processing apparatus; and
a notification unit that is adapted to send a notification to a display separate from the image processing apparatus of a status of the process, the notification being configured for the display to display the status, the status including information indicating a progress of the process, the results of the process, and parameters used in the process, performs first communication from the information processing apparatus to the display in case that the status as a notification target occurs, and notifies the display of the occurring status by second communication that is to transmit a hypertext transfer protocol (HTTP) response in response to an HTTP request from the display to which the first communication has been performed.

2. The information processing apparatus according to claim 1, wherein besides a first notification to notify the display of the occurring status through the second communication, the notification unit is adapted to perform a second notification to notify the display of the status through third communication that is originated by the information processing apparatus in response to the occurring status without performing the first communication, and performs the first notification or the second notification depending on the occurring status.

3. The information processing apparatus according to claim 2, wherein the notification unit determines whether to perform the first notification or the second notification depending on a type of the occurring status, a size of information representing the occurring status, or a degree of change in the occurring status.

4. The information processing apparatus according to claim 3, wherein in case that a predetermined operation is performed on the display after one of the first notification and the second notification is performed, the notification unit performs the other of the first notification and the second notification thereafter.

5. The information processing apparatus according to claim 4, wherein the processor is further configured to act as a providing unit that provides the display with an image associated with the status of the process,
wherein the notification unit notifies the display of the status associated with the image, and
wherein the display displays the image associated with the notified status from among the provided images in response to the notification of the status.

6. The information processing apparatus according to claim 3, wherein the processor is further configured to act as a providing unit that provides the display with an image associated with the status of the process,
wherein the notification unit notifies the display of the status associated with the image, and
wherein the display displays the image associated with the notified status from among the provided images in response to the notification of the status.

7. The information processing apparatus according to claim 2, wherein in case that a predetermined operation is performed on the display after one of the first notification and the second notification is performed, the notification unit performs the other of the first notification and the second notification thereafter.

8. The information processing apparatus according to claim 7, wherein the processor is further configured to act as a providing unit that provides the display with an image associated with the status of the process,
wherein the notification unit notifies the display of the status associated with the image, and
wherein the display displays the image associated with the notified status from among the provided images in response to the notification of the status.

9. The information processing apparatus according to claim 2, wherein the processor is further configured to act as a providing unit that provides the display with an image associated with the status of the process,
wherein the notification unit notifies the display of the status associated with the image, and
wherein the display displays the image associated with the notified status from among the provided images in response to the notification of the status.

10. The information processing apparatus according to claim 1, wherein the processor is further configured to act as a providing unit that provides the display with an image associated with the status of the process,
wherein the notification unit notifies the display of the status associated with the image, and
wherein the display displays the image associated with the notified status from among the provided images in response to the notification of the status.

11. An information processing system comprising an information processing apparatus and a display;
  wherein the information processing apparatus includes a processor configured to act as:
    a processing unit that performs a process on the information processing apparatus, and
    a notification unit that is adapted to send a notification to a display separate from the image processing apparatus of a status of the process, the notification being configured for the display to display the status, the status including information indicating a progress of the process, the results of the process, and parameters used in the process, performs first communication from the information processing apparatus to the display in case that the status as a notification target occurs, and notifies the display of the occurring status by second communication to transmit a hypertext transfer protocol (HTTP) response in response to an HTTP request from the display to which the first communication has been performed,
  wherein the display is adapted to display the status of the process and transmits to the information processing apparatus an HTTP request requesting the status to be notified upon performing the first communication with the information processing apparatus.

12. The information processing system according to claim 11, wherein through the first communication, the notification unit notifies the display of information related to one of a type of the occurring status, a size of information representing the occurring status, and a degree of change in the occurring status, and
  wherein the display determines whether to transmit the HTTP request that requests the status to be notified in response to the information notified in the first communication.

13. An information processing method of an information processing apparatus, comprising:
  utilizing a processor for:
    performing a process on the information processing apparatus; and
    sending a notification to a display separate from the image processing apparatus of a status of the process, the status including information indicating a progress of the process, the results of the process, and parameters used in the process, for the display to display the status, performing first communication from the information processing apparatus to the display in case that the status as a notification target occurs, and notifying the display of the occurring status by second communication to transmit a hypertext transfer protocol (HTTP) response in response to an HTTP request from the display to which the first communication has been performed.

14. A non-transitory computer readable medium storing a program causing a computer to execute a process for processing information, the process comprising:
  utilizing a processor for:
    performing a process on the information processing apparatus; and
    sending a notification to a display separate from the image processing apparatus of a status of the process, the status including information indicating a progress of the process, the results of the process, and parameters used in the process, for the display to display the status, performing first communication from the information processing apparatus to the display in case that the status as a notification target occurs, and notifying the display of the occurring status by second communication to transmit a hypertext transfer protocol (HTTP) response in response to an HTTP request from the display to which the first communication has been performed.

* * * * *